United States Patent
Cregg et al.

(10) Patent No.: US 9,474,133 B2
(45) Date of Patent: *Oct. 18, 2016

(54) SENSOR LIGHTING CONTROL SYSTEMS AND METHODS

(71) Applicant: SmartLabs, Inc., Irvine, CA (US)

(72) Inventors: Daniel Brian Cregg, Newport Beach, CA (US); Robert Ellery Slick, Irvine, CA (US)

(73) Assignee: SmartLabs, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,786

(22) Filed: Sep. 3, 2015

(65) Prior Publication Data

US 2016/0157325 A1    Jun. 2, 2016

Related U.S. Application Data

(63) Continuation of application No. 14/557,123, filed on Dec. 1, 2014, now Pat. No. 9,155,153.

(51) Int. Cl.
  *H05B 33/08* (2006.01)
  *H05B 37/02* (2006.01)
  *H04L 12/28* (2006.01)

(52) U.S. Cl.
  CPC ........ *H05B 37/0263* (2013.01); *H04L 12/2816* (2013.01); *H05B 33/0854* (2013.01); *H05B 37/0218* (2013.01); *H05B 37/0227* (2013.01); *H05B 37/0272* (2013.01); *H05B 37/0281* (2013.01)

(58) Field of Classification Search
  CPC .......... H05B 37/0227; H05B 37/0218; H05B 37/0272; H05B 37/0281
  USPC .......................................................... 315/155
  See application file for complete search history.

(56) References Cited

U.S. PATENT DOCUMENTS

| | | |
|---|---|---|
| 7,046,642 B1 | 5/2006 | Cheng et al. |
| 7,069,490 B2 | 6/2006 | Niu et al. |
| 7,233,573 B2 | 6/2007 | Walls et al. |
| 7,286,511 B2 | 10/2007 | Zhong et al. |
| 7,345,998 B2 | 3/2008 | Cregg et al. |
| 7,663,502 B2 | 2/2010 | Breed |
| 7,904,187 B2 | 3/2011 | Hoffberg |
| 8,081,649 B2 | 12/2011 | Cregg et al. |
| 8,190,275 B2 | 5/2012 | Change |
| 8,301,180 B1 | 10/2012 | Gailloux |
| 8,495,244 B2 | 7/2013 | Bonar |
| 8,516,087 B2 | 8/2013 | Wilson |

(Continued)

FOREIGN PATENT DOCUMENTS

WO    WO 2006/065275    6/2006

OTHER PUBLICATIONS

Insteon—White Paper: The Details, Insteon, 2013.

(Continued)

*Primary Examiner* — Don Le
(74) *Attorney, Agent, or Firm* — Knobbe, Martens, Olson & Bear, LLP

(57) ABSTRACT

A sensor lighting control system automatically controls lighting on a home automation network without creating unnecessary network traffic. A sensor module uses the light level to determine when a command to turn the light ON should be resent over the network.

20 Claims, 16 Drawing Sheets

(56) References Cited

U.S. PATENT DOCUMENTS

| | | | |
|---|---|---|---|
| 8,610,305 B2 | 12/2013 | Sarid | |
| 8,619,819 B2 | 12/2013 | Seelman | |
| 8,630,741 B1* | 1/2014 | Matsuoka | H04L 12/2829 |
| | | | 700/12 |
| 8,653,935 B2 | 2/2014 | Baker | |
| 9,014,067 B2 | 4/2015 | Chun | |
| 9,054,892 B2 | 6/2015 | Lamb | |
| 9,071,453 B2 | 6/2015 | Shoemaker | |
| 9,078,087 B2 | 7/2015 | Yoon | |
| 9,081,501 B2 | 7/2015 | Asaad et al. | |
| 9,143,962 B2 | 9/2015 | Brady | |
| 9,148,443 B2 | 9/2015 | Chizeck | |
| 9,232,615 B2 | 1/2016 | Cregg et al. | |
| 9,300,484 B1 | 3/2016 | Cregg et al. | |
| 2003/0103521 A1 | 6/2003 | Raphaeli et al. | |
| 2003/0142685 A1 | 7/2003 | Bare | |
| 2004/0131125 A1 | 7/2004 | Sanderford et al. | |
| 2004/0243684 A1 | 12/2004 | Ha et al. | |
| 2006/0250745 A1* | 11/2006 | Butler | H05B 37/0281 |
| | | | 361/160 |
| 2011/0133655 A1* | 6/2011 | Recker | H02J 9/02 |
| | | | 315/159 |
| 2011/0187275 A1 | 8/2011 | Giltaca et al. | |
| 2012/0249013 A1 | 10/2012 | Valois et al. | |
| 2012/0286673 A1* | 11/2012 | Holland | H05B 33/0854 |
| | | | 315/155 |
| 2013/0069542 A1 | 3/2013 | Curasi et al. | |
| 2013/0261821 A1* | 10/2013 | Lu | H04L 12/2807 |
| | | | 700/289 |
| 2014/0022061 A1 | 1/2014 | Apte | |
| 2014/0167618 A1 | 6/2014 | Wang | |
| 2014/0219193 A1 | 8/2014 | Linde | |
| 2014/0269425 A1 | 9/2014 | Fisher | |
| 2014/0280398 A1 | 9/2014 | Smith et al. | |
| 2014/0321268 A1 | 10/2014 | Saltsidis | |
| 2015/0035437 A1 | 2/2015 | Panopoulos et al. | |
| 2015/0120000 A1 | 4/2015 | Coffey et al. | |
| 2015/0295949 A1 | 10/2015 | Chizeck et al. | |
| 2015/0296599 A1* | 10/2015 | Recker | H05B 37/0272 |
| | | | 315/153 |
| 2016/0027262 A1* | 1/2016 | Skotty | G08B 13/22 |
| | | | 340/541 |

OTHER PUBLICATIONS

"Refresh! Insteon Technology," Electronic Design (EE) Product News, Staff Article, Apr. 5, 2006.

Malaysian Notice of Allowance, re MY Application No. PI 2012003571, dated Apr. 15, 2016.

* cited by examiner

1700

| Center Frequency | 915 MHz |
|---|---|
| Data Encoding Method | Mancester |
| Modulation Method | FSK |
| FSK Deviation | 64 KHz |
| FSK Symbol Rate | 76,800 symbols per second |
| Data Rate | 38,400 bits per second |
| Range | 150 feet outdoors |

FIG. 22

SENSOR LIGHTING CONTROL SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Communication among low-cost devices is useful in many applications. For example, in a home environment, room occupancy sensors, light switches, lamp dimmers, and a gateway to the Internet can all work together if they are in communication. A room in a home could be illuminated when people are present, or else an alarm could be sounded, depending on conditions established by a program running on a remote intelligent device.

SUMMARY

A sensor lighting control system automatically controls lighting on a home automation network without creating unnecessary network traffic. A sensor module uses the light level to determine when a command to turn the light ON should be resent over the network.

According to a number of embodiments, the disclosure relates to a method to automatically control lighting on a home-control network. The method comprises automatically transmitting over a home-control network a lighting control command from a sensor module to control a state of a light, where the home-control network is configured to propagate the lighting control command using powerline signaling and radio frequency (RF) signaling, and the lighting control command is one of an ON command and an OFF command. The method further comprises detecting motion and ambient light with the sensor module, transmitting the ON command through the home-control network and starting a timer having a timer count in response to detected motion when the ambient light is less than a threshold, determining whether the light is OFF, where the light is further controlled independently of the sensor module by a switch configured to send the lighting control commands over the home-control network in response to a physical input by a user, and setting the timer count to an end count when the light is OFF in response to the physical input by the user.

In an embodiment, the method further comprises setting the timer count to a start count when the light is ON and motion is detected. In another embodiment, the method further comprises transmitting the OFF command through the home-control network when the light is ON, the timer times out, and no motion is detected. In a further embodiment, the method further comprises receiving a message over the home-control network comprising the threshold, where the threshold is user settable. In a yet further embodiment, the method comprises determining whether the light is OFF by receiving and decoding a message transmitted over the home-control network, the message being transmitted in response to the physical input by the user and comprising the state of the light. In another embodiment, the method comprises determining whether the light is OFF by detecting the ambient light and comparing the detected ambient light to the threshold.

Certain embodiments relate to a system to automatically control lighting on a home-control network. The system comprises a sensor module configured to automatically transmit over a home-control network a first lighting control command to control a state of a light, and a switch configured to transmit over the home-control network a second lighting control command to control the light in response to a manual input from a user, where the home-control network is configured to propagate the first and second lighting control commands using powerline signaling and radio frequency (RF) signaling, and the first and second lighting control commands are one of an ON command and an OFF command. The system further comprises a lighting module comprising the light and configured to receive the first and second lighting control commands over the home-control network and turn ON the light or turn OFF the light in response to the first and second lighting control commands, a motion sensor configured to detect motion in an area proximate to the lighting module, and a light detector configured to detect ambient light in the area proximate to the lighting module. The sensor module is further configured to send the ON command to the lighting module and start a timer having a timer count when the motion is detected and a level of the ambient light is below a threshold, and further configured set the timer count to an end count when the lighting module receives the OFF command from the switch.

In an embodiment, sensor module is further configured to set the timer count to a start count when the light is ON and the motion is detected. In another embodiment, sensor module is further configured to transmit the OFF command over the home-control network when the light is ON, the timer times out, and no motion is detected. In a further embodiment, the sensor module is further configured to receive a message over the home-control network comprising the threshold, wherein the threshold is user settable. In a yet further embodiment, the sensor module is further configured to determine whether the light is OFF by receiving and decoding a message transmitted over the home-control network, where the message is transmitted in response to the manual input by the user and comprising the state of the light. In an embodiment, the sensor module is further configured to determine whether the light is OFF by detecting the ambient light and comparing the detected ambient light to the threshold.

According to other embodiments, the disclosure relates to a sensor module to control a light on a home-control network. The sensor module comprises a light detector configured to detect ambient light in an area proximate to a light, a motion detector configured to detect motion in the area proximate to the light, a transmitter configured to transmit through a home-control network a lighting control command to control a state of the light, where the home-control network is configured to propagate the lighting control command using powerline signaling and radio frequency (RF) signaling, and the lighting control command being one of an ON command and an OFF command, and a receiver configured to receive and decode messages from the home-control network. The sensor module further comprises computer hardware configured to start a timer having a timer count and send the ON command to the transmitter for transmission over the home-control network to turn the light ON in response to detected motion when the ambient light is less than a threshold. The computer hardware is further configured to determine whether the light is OFF, where the light is controlled independently of the sensor module by a switch configured to send the lighting control commands over the home-control network in response to a physical input by a user, and where the computer hardware is further configured to set the timer count to an end count when the light is OFF in response to the physical input by the user.

In an embodiment, the computer hardware is further configured to determine whether the light is OFF by receiving and decoding a message over the home-control network comprising the state of the light, the message being transmitted in response to the physical input by the user. In another embodiment, the computer hardware is further configured to determine whether the light is OFF by detecting the ambient light and comparing the detected ambient light to the threshold. In a further embodiment, the computer hardware is further configured to set the timer count to a start count when the light is ON and motion is detected. In a yet further embodiment, the computer hardware is further configured to transmit the OFF command through the home-control network when the light is ON, the timer times out, and no motion is detected.

In an embodiment, the powerline signaling comprises message data modulated onto a carrier signal and the modulated carrier signal is added to a powerline waveform, and the RF signaling comprises the message data modulated onto an RF waveform.

For purposes of summarizing the disclosure, certain aspects, advantages, and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 22 is a table of exemplary specifications for RF signaling within the network, according to certain embodiments.

DETAILED DESCRIPTION OF THE PREFERRED EMBODIMENT

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

A simulcast mesh communication network utilizes powerline signaling and radio frequency signaling to propagate messages to control network devices. Each network device installed on the network is configured to repeat messages to others of the network devices on the network. Further, the network devices are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination. However, too much message traffic slows the network speed.

For example, a motion sensor can be configured to send a command over the network to a light to turn ON the light every time motion is detected and the ambient light level is low. However, this would create too much unnecessary traffic on the network, and possibly slow the performance of the network.

To alleviate message traffic, the motion sensor can be configured to send an ON command and start a countdown timer based on a preset time. At the end of the time, the motion sensor sends a network command to turn OFF the light. If a user stays in the room, for example, each detection of motion resets the countdown timer without resending the ON command over the network. The motion sensor turns the light OFF after the last detected motion after the countdown time expires.

However, if the user manually turns the light OFF using a switch associated with the light when exiting the area, such as a light switch by the door, for example, and then returns to the area before the countdown time is reached, the motion sensor will reset the countdown timer, but not send the ON command to turn ON the light.

Embodiments are disclosed to use the ambient light level to determine if the ON command should be sent to the light. In other words, if the ambient light level indicates that the light should be turned ON after it was manually turned OFF, the motion sensor sends the ON command to the light.

Other embodiments are disclosed to query the light to determine if a manual user action turned the light OFF. When the motion sensor determines that the switch sent an OFF command to the light and motion is detected, the motion sensor will send the ON command to the light.

Sensor Lighting Control

Figure 1:
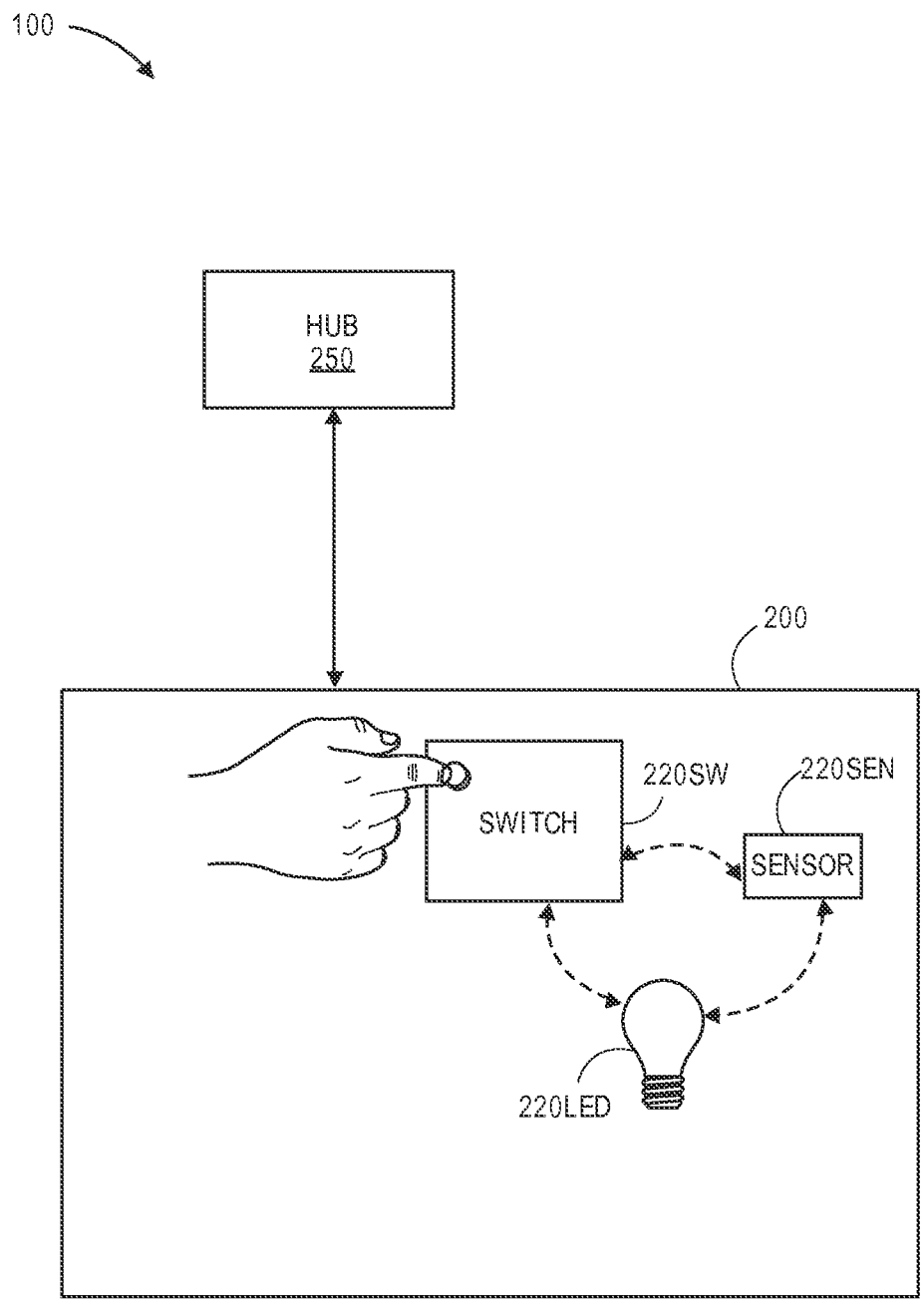
FIG. 1 illustrates a block diagram of a sensor lighting control system, according to certain embodiments.

FIG. 1 illustrates a block diagram of a sensor lighting control system 100 comprising a network controller or hub 250, and a network 200 comprising one or more network devices 220.

The network 200 comprises a dual-band mesh area networking topology to communicate with devices 220 located within the network 200. The network devices 220 can comprise, for example, light switches, thermostats, motion sensors, and the like. In an embodiment, the network 200 comprises a home-control network. In another embodiment, the network 200 comprises an INSTEON® network utilizing an INSTEON® engine employing a powerline protocol and a radio frequency (RF) protocol as is further described with respect to FIGS. 7-22.

In the system 100 illustrated in FIG. 1, the network 200 comprises a switch 220SW, a sensor 220SEN, and an LED light 220LED, where the switch 220SW and the sensor 220SEN are linked to the LED light 220LED on the network 200. In an embodiment, the light 220LED comprises one or more LED's. In another embodiment, the light 220LED comprises one or more lighting devices or lighting modules. In another embodiment, the light 220LED comprises one or more lighting devices and/or one or more network devices 220.

The switch 220SW and the sensor 220SEN are configured to control the light LED220 using messages comprising lighting control commands sent over the network 200 to the light 220LED. In an embodiment, the lighting control commands comprises ON/OFF commands that cause the light 220LED to turn ON/OFF.

In another embodiment, the lighting control ON command causes the light 220LED to restore to a state stored in local memory. For example, if during installation or initialization of the light 220LED on the network 200, a state of 80% illumination is stored in the local memory, then the ON command causes the light 220LED to illuminate to approximately 80% of its total illumination capability.

In a further embodiment, the light 220LED uses the ON command as a trigger to restore an illumination state stored in the local memory. In a further embodiment, devices 220 use the ON command to restore the device 220 to a state that is stored in local memory. In yet another embodiment, devices 220 that are desired in a certain state when there is motion and light level below a threshold use the lighting control commands to restore to the certain state that is stored in local memory.

In an embodiment, the hub 250 comprises the local memory. In another embodiment, the light 220LED comprises the local memory. In a further embodiment, the device 220 comprises the local memory.

In other embodiments, the illumination from the light 220LED can be dimmed or ramped up and one or more of the switch 220SW and the sensor 220SEN are configured to dim/ramp the LED light 220LED using messages comprising DIM/RAMP commands sent over the network 200 to the light 220LED.

The switch 220SW is further configured to receive a physical input, such as for example, a user depressing a button, toggling a switch, or the like, to change the state of the light 220LED from ON to OFF or from OFF to ON.

The sensor 220SEN comprises one or more motion sensors and one or more light detectors. In an embodiment, the sensor 220SEN is further configured to send the lighting control commands, as described above, to the light 220LED to control the light 220LED based at least in part on input from the motion sensor and the light detector. In another embodiment, the sensor 220SEN is configured to turn the light 220LED ON/OFF based at least in part on input from the motion sensor and the light detector. In a further embodiment, the sensor 220SEN is further configured to change the state of the light 220LED from ON to OFF or from OFF to ON based at least in part on the inputs from the motion sensor and the light detector and based at least in part on the ON/OFF state of the light 220LED. In an embodiment, the motion sensor and/or the light detector are located proximate to the light 220LED.

Figure 2:
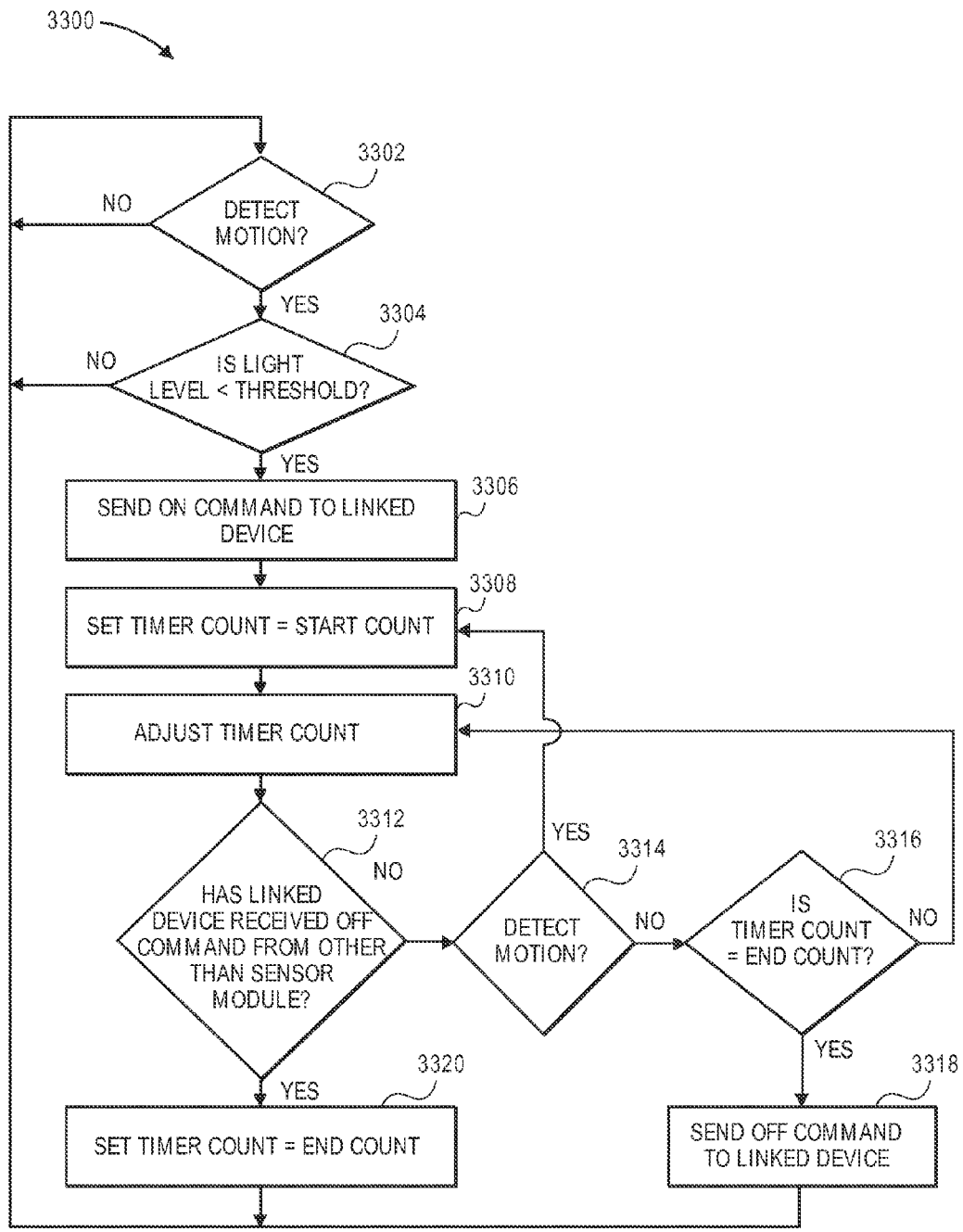
FIG. 2 illustrates a process to control a light associated with a sensor and a switch, according to certain embodiments.

FIG. 2 illustrates an exemplary process 3300 to control the light 220LED associated with the sensor 220SEN and the switch 220SW. The sensor 220 SEN waits at step 3302 to detect motion.

When the sensor 220SEN detects motion, the process 3300 moves to step 3304 where the sensor 220SEN determines whether the ambient light is less than a threshold. When the ambient light is greater than the threshold, the process 3300 returns to step 3302. When the ambient light is less than the threshold, the process 3300 moves to step 3306. In an embodiment, the threshold is user selectable.

At step 3306, the sensor 220SEN sends an ON command to the light 220LED through the network 200 to control the light 220LED, as described above. At step 3308, the sensor 220SEN sets a timer count associated with a timer to a start count, or in other words, enables a timer. In an embodiment, the timer comprises a countdown timer. In other embodiments, the timer comprises other types of counters, such as, for example, a count-up timer, a reset timer, an interval timer, a preset timer, a counter, and the like. In an embodiment, the time, count, or timer count is user selectable.

At step 3310, the sensor 220SEN adjusts the timer count. For example, when the timer comprises a countdown timer, the sensor 220SEN decrements the timer count, when the timer comprises a count-up timer, the sensor 220SEN increments the timer count, and the like.

At step 3312, the sensor 220SEN determines whether the light 220LED has received an OFF command from other than the sensor 220SEN, indicating that the light 220LED is OFF. In some embodiments, the sensor 220SEN determines whether the user manually turned OFF the light 220LED that was turned ON during motion activation. If the user manually turned OFF the light 220LED, the switch 220SW sends an ON command to the light 220LED over the network 200. In an embodiment, the light 220LED sends a response to the ON command over the network 200.

In an embodiment, the sensor 220SEN determines whether the light 220LED has received an OFF command by listening to the messages on the network 200. For example, the user switches the light 220LED at the switch 220SW before the timer count reaches an end count or the end of its counting interval. The switch 220LED sends a network message to the light 220LED comprising an OFF command. In an embodiment, the light 220LED, in response to the received OFF command, sends a response over the network 200 indicating that the light is OFF. The sensor 220SEN, as well as the other devices 220 on the network 200, receive the response message from the light 220LED, and the sensor 220SEN decodes the response message to determine whether the light 220LED is OFF. In a further embodiment, the sensor 220SEN, as well as the other devices 220 on the network 200, receive the command from the switch 220SW and determines that the light 220LED is OFF.

In another embodiment, the sensor 220SEN checks the ambient light level to determine whether the ambient light level indicates that the light 220LED is OFF. In an embodiment, the sensor 220SEN compares the ambient light level to a selectable threshold. In another embodiment, the sensor 220SEN compares the ambient light level to a stored ambient light level, where the sensor 220SEN stores the ambient light level after the light 220LED is ON. Based on the comparison, the sensor 220SEN determines whether the light 220LED is OFF.

When the light 220LED is ON, the process 3300 moves to step 3314 where the sensor 220SEN determines whether there is detected motion. When motion is detected, the process 3300 moves to step 3308 where the timer count is set to the start count, or in other words, the timer is reinitialized.

When motion is not detected, the process 3300 moves to step 3316, where the sensor 220SEN determines whether the timer count has reached the end count or the timer has timed out. For example, when the timer comprises a countdown timer, the sensor 220SEN determines whether the timer has reached a count of zero. When the timer count has not reached the end count, the process 3300 moves to step 3310.

At step 3310, the sensor 220SEN adjusts the timer count. For example, when the timer comprises a countdown timer, the sensor 220SEN decrements the counter, when the timer comprises a count-up timer, the sensor 220SEN increments the timer, and the like.

If, at step 3316, the timer count has reached the end count or the timer has timed out, the process 3300 moves to step 3318 where the sensor 220SEN sends a message comprising an OFF command to the light 220LED via the network 220. After sending the OFF command, the process 3300 moves to step 3302 to wait for motion to be detected.

If, at step 3312, the light 220LED is OFF, the process 3300 moves to step 3320 where the sensor 220SEN sets the time count to the end count. For example, for a timer comprising a countdown timer, the sensor 220SEN sets the timer count to zero. The process 3300 then moves to step 3302 to wait for motion to be detected.

Figure 3:
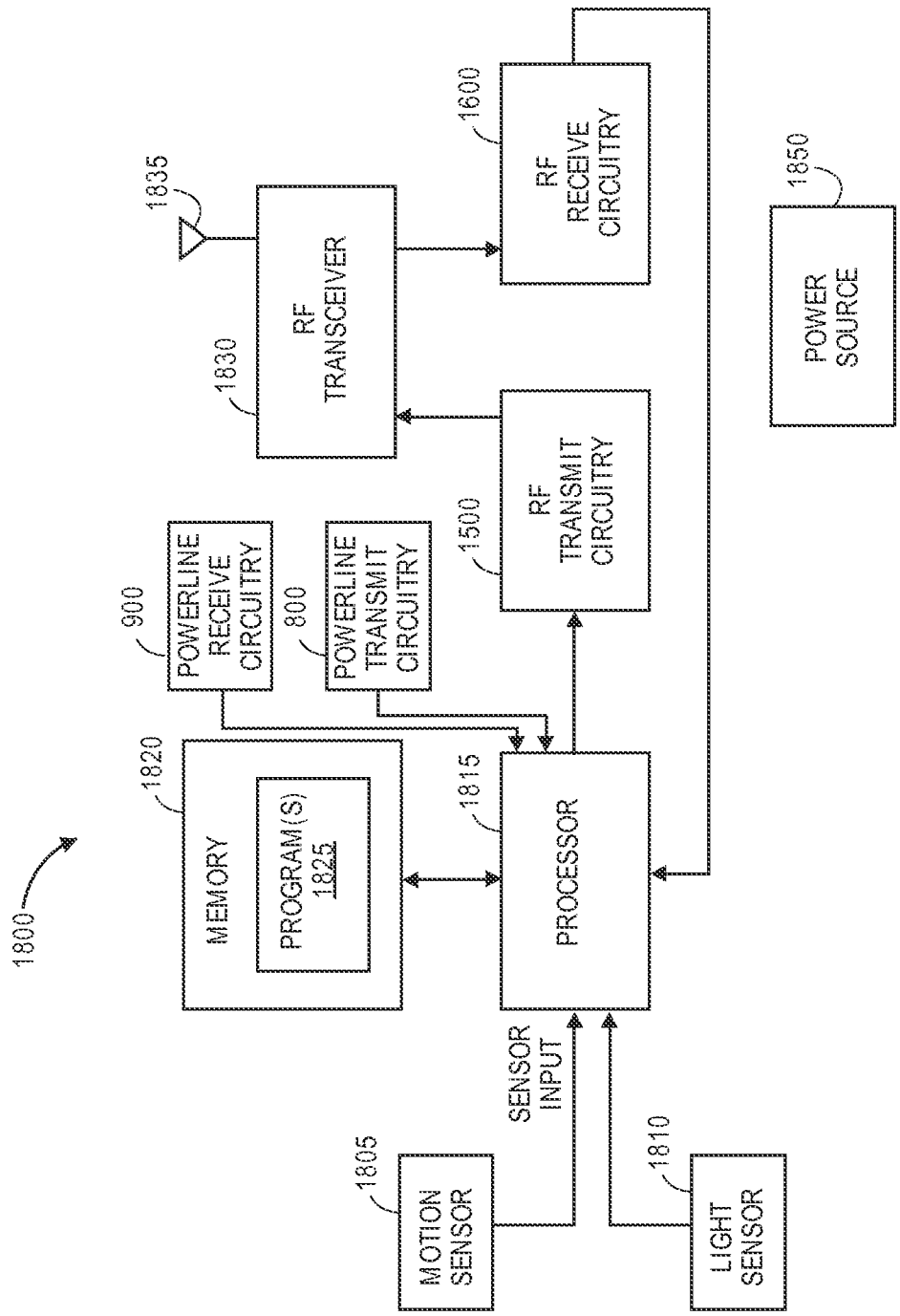
FIG. 3 is a block diagram illustrating a light controlling sensor, according to certain embodiments.

FIG. 3 illustrates an embodiment of a light controlling sensor module 1800 comprising a motion sensor 1805, a light detector 1810, a processor 1815, memory 1820, a radio frequency (RF) transceiver 1830, an antenna 1835, a power source 1850, RF transmit circuitry 1500, RF receive circuitry 1600, powerline receive circuitry 900, and powerline transmit circuitry 800. In an embodiment, the sensor module 1800 comprises a low-power sensor module.

Motion Sensor

The motion sensor 1805 is configured to detect motion and provide a signal responsive to detected motion to the processor 1815. In an embodiment, the motion sensing is passive infrared (PIR) motion sensing such that the PIR motion sensor 1805 measures infrared (IR) light radiating from objects in its field of view. In an embodiment, the motion sensor 1805 provides a serial bit stream to the processor 1815.

Light Detector

The light detector or light sensor 1810 is configured to detect ambient light and provide a signal responsive to the ambient light to the processor 1815. In an embodiment, the light detector 1810 provides a serial bit stream to the processor 1815.

Processor and Memory

The processor circuitry 1815 provides program logic and memory 1820 in support of programs 1825 and intelligence within the sensor module 1800. In an embodiment, the processor circuitry 1815 comprises a computer and the associated memory 1820. The computers comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like.

The memory 1820 can comprise one or more logical and/or physical data storage systems for storing data and applications used by the processor 1815 and the program logic 1825. The program logic 1825 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the processor 1815 executes the programs or rule sets 1825 stored in the memory 1820 to process sensor data and messages. The processor 1815 receives data from at least one of the motion sensor 1805 and the light detector 1810 indicative of sensed motion and ambient light, respectively. The processor 1815 receives data and/or commands from messages received from one or more of the network controller 250, a user through an intelligent device, a user computer, and other network devices 220. Further, the processor 1815 composes messages to one or more of the network controller 250, the user through the intelligent device, the user computer, and the other network devices 220, where the messages are based at least in part on the data received from at least one of the motion sensor 1805, the light sensor 1810, and the decoded message. The messages are transmitted and received via the network 200 using one or more of radio frequency (RF) communications and powerline communications.

In other embodiments, the programming 1825 may include processes to conserve power consumed by the low power sensor module 1800. Such processes may periodically cause the processor 1815 to check for messages from the network 200 that are addressed to it. In an embodiment, the processor 1815 receives one or more inputs, such as interrupts or the like, from one or more sensors, such as the motion sensor 1805, the light detector 1810, a touch keypad, or the like.

Radio Frequency (RF) Communications

In an embodiment, the processor 1815 sends the message to the RF transmit circuitry 1500, where the message is encoded using FSK, for example, onto a baseband signal, which is up converted and transmitted from antenna 1835 to other devices 220, 250 on the network 200. In an embodiment, the RF transmit circuitry 1500 comprises a buffer FIFO 1525, a generator 1530, a multiplexer 1535, and a data shift register 1540. The operation of the RF transmit circuitry 1500 is described in further detail below with respect to FIG. 20.

In addition, the antenna 1835 receives RF signals from at least one device 220, 250 on the network 200 which are down converted to a baseband FSK encoded signal and decoded by the RF receive circuitry 1600. In an embodiment, the RF receive circuitry 1600 comprises a shift register 1620, a code detector 1625, a receive buffer storage controller 1630, a buffer FIFO 1635, a CRC checker 1640. The operation of the RF receive circuitry 1600 is described in further detail below with respect to FIG. 21. In an embodiment, the FM carrier is approximately 915 MHz.

Powerline Communications

Network messages are sent over the powerline by modulating the data onto a carrier signal, which is added to the powerline signal. In an embodiment, the carrier signal is approximately 131.65 kHz. In an embodiment, the processor 1815 sends messages to the powerline transmit circuitry 800 for transmission over the network 200 via the powerline and receives data and/or commands from the powerline receive circuitry 900 received from the network 200 via the powerline. The overall flow of information related to sending and receiving messages over the network 200 via the powerline is described in further detail below with respect to FIG. 12.

Powerline Message Detection

Figure 12:
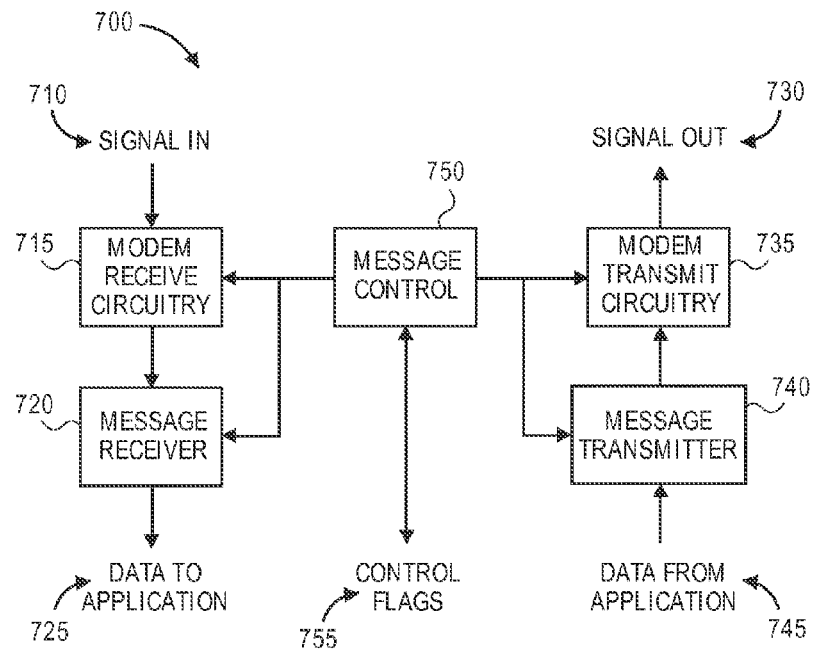
FIG. 12 is a block diagram illustrating the overall flow of information related to sending and receiving messages over the network, according to certain embodiments.

In an embodiment, the powerline transmit circuitry 800 comprises at least modem transmit circuitry 735 and a message transmitter 740 as illustrated in FIG. 12. In an embodiment, the message transmitter 740 comprises a zero crossing detector 845, transmit control 825, a buffer FIFO 815, a sync, start code, CRC generator 830, a multiplexer 835, a data shift register 840, a modulator 855, and a carrier generator 850. The operation of the message transmitter 740 is described in further detail below with respect to FIG. 13.

Zero Crossing Detection

In an embodiment, the powerline receive circuitry 900 comprises at least modem receive circuitry 715 and a message receiver 720 as illustrated in FIG. 12. In an embodiment, the modem receive circuitry 715 comprises a Costas Phase-Lock-Loop (PLL) 920, a phase lock detector 925, bit sync circuitry 930, a data shift register 935 a start code detector 940, a window timer 945, receive buffer storage control circuitry 955, a receive buffer FIFO 960, a data complementer 970, and a CRC checker 975. The operation of the modem receive circuitry 715 is described in further detail below with respect to FIG. 14.

Power Source

In an embodiment, the power source 1850 comprises the powerline, an AC/DC converter, and a regulator to convert and regulate the powerline voltage to approximately 5 volts to power the circuitry 800, 900, 1500, 1600, 1805, 1810, 1815, 1820, and 1830.

In another embodiment, the power source 1850 comprises a battery and a regulator to regulate the battery voltage to approximately 5 volts to power the circuitry 800, 900, 1500, 1600, 1805, 1810, 1815, 1820, and 1830. Embodiments of the battery can be rechargeable or disposable. In other embodiments, the power source 1850 comprises other voltage sources, AC/DC converters, photovoltaic cells, electromechanical batteries, standard on-time use batteries, and the like.

User Communication System

Figure 4:
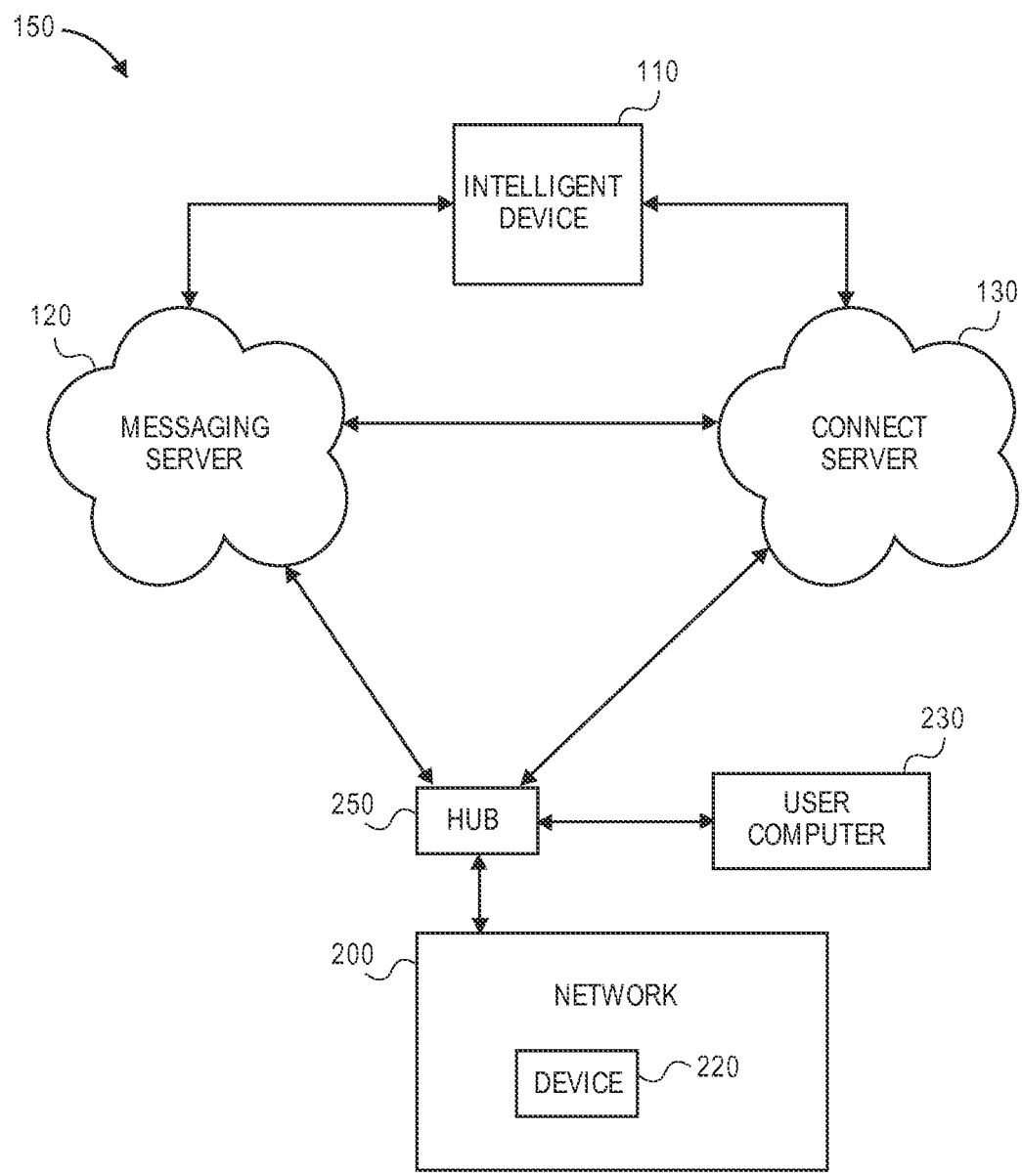
FIG. 4 is a block diagram illustrating a system to provide user communications to a home-control network, according to certain embodiments.

FIG. 4 is a block diagram illustrating a system 150 comprising a messaging server 120, a connect server 130, and an intelligent device 110 to communicate with network devices 220 installed onto the communication network 200 via the network controller, an intelligent controller, or hub 250. A user interfaces with the intelligent device 110, a user computer 230, or the like, to communicate with the hub 250, the network 200, and/or the network devices 220.

In another embodiment, the system 150 is used to securely install the hub 250 onto the network 200 prior to communicating with the network devices 220.

During operation of the network 200, the network controller 250 is configured to transmit data and/or commands through the network 200 to network devices 200 and to receive through the network 200 messages from the network devices 220. The network controller 250 can further be configured to provide information to a user through one or more of the intelligent device 110 and the computer 230 and/or to receive user commands from the user through one or more of the intelligent device 110 and the user computer 230.

In an embodiment, the network 200 comprises a dual-band mesh area networking topology to communicate with devices 220 located within the network 200. The network devices 220 can comprise, for example, light switches, thermostats, motion sensors, and the like. In an embodiment, the network 200 comprises a home-control network. In another embodiment, the network 200 comprises an INSTEON® network utilizing an INSTEON® engine employing a powerline protocol and an RF protocol as is further described with respect to FIGS. 7-22.

Figure 5:
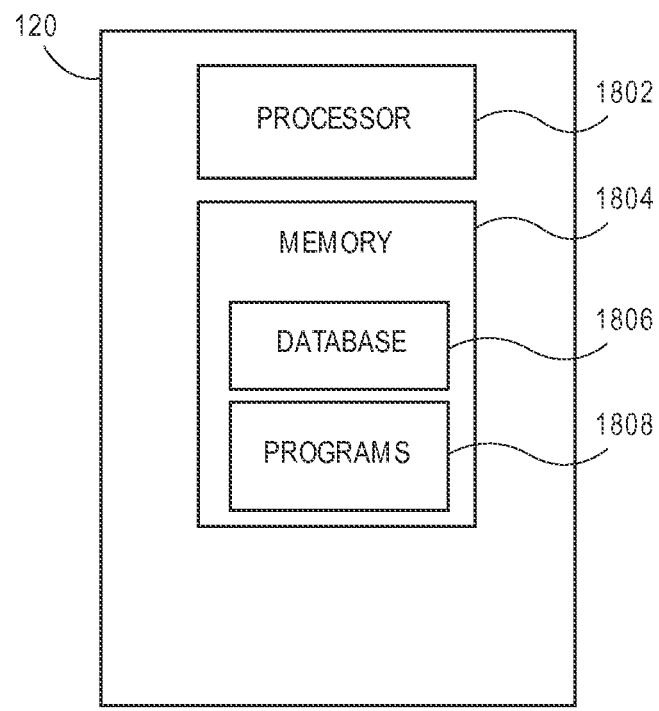
FIG. 5 is a block diagram illustrating a messaging server, according to certain embodiments.

Referring to FIG. 4, in an embodiment, the messaging server 120 communicates with the intelligent device 110, the connect server 130, and the network controller 250. FIG. 5 illustrates a block diagram of the messaging server 120 comprising a processor 1802 and memory 1804. The memory 1804 comprises one or more databases 1806 and one or more programs 1808 where the processor 1802 is configured to access the databases 1806 and execute the programs 1808 to provide cloud-hosted messaging services.

The messaging server 120 is located in the cloud where it receives and transmits through a global network such as the Internet. In an embodiment, the messaging server 120 is at least a part of a cloud-hosted messaging service based on a standard messaging protocol that is configured to send and receive messages and provide computing services to host, manage, develop, and maintain applications. In another embodiment, the messaging service comprises the messaging server 120.

In an embodiment, the messaging server 120 utilizes a publish/subscribe protocol and presents messaging patterns where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are. Thus, the messaging server 120 provides a communications platform that enables the network controller 250 to have a persistent connection between the network controller 250 and the connect server 130. An example of a publish/subscribe messaging service is Pub-Nub™. Examples of other messaging services are, Amazon Web Services, Firebase, Frozen Mountain, Pusher, and the like.

Figure 6:
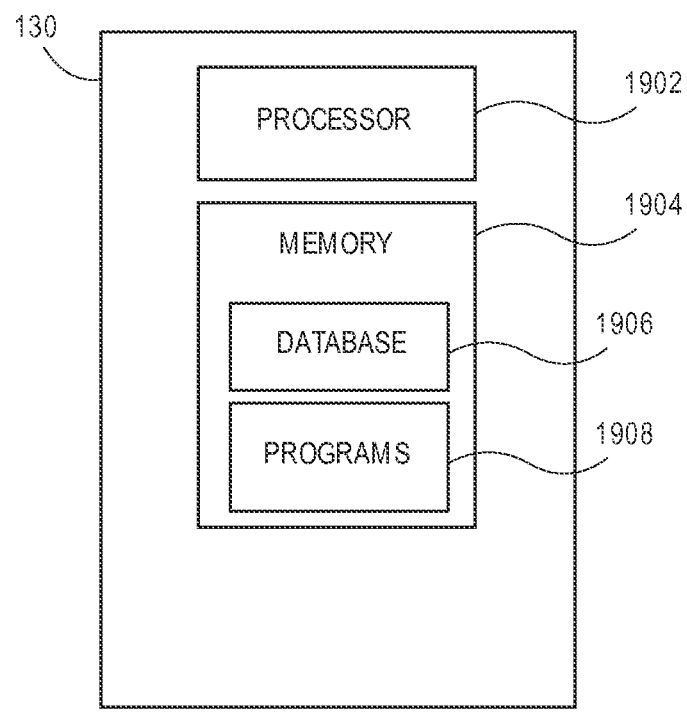
FIG. 6 is a block diagram illustrating a connect server, according to certain embodiments.

Referring to FIG. 4, In an embodiment, the connect server 130 communicates with the intelligent device 110, the messaging server 120, and the network controller 250. FIG. 6 is a block diagram of the connect server 130 comprising a processor 1902 and memory 1904. The memory 1904 comprises one or more databases 1906 and one or more programs 1908 where the processor 1902 is configured to access the databases 1906 and execute the programs 1908 to provide communication between the web-based applications 1908 and databases 1906 and the network controller 250. In an embodiment, the connect server 130 communicates with a plurality of network controllers 250, where each of the network controllers 250 is associated with a network 200. The connect server 130 communicates with the plurality of network controllers 250 through channels where the channels comprise one or more global channels that allow communications with more than one network controller 250 and sets of individual channels that allow the control server 130 to communicate with one network controller 250.

The connect server 130 is located in the cloud where it receives and transmits through a global network such as the Internet. In an embodiment, the connect server 130 is at least a part of a cloud-based home management service configured to provide communication between web-based applications and databases and the network controller 250. In an embodiment, the web-based applications run on the intelligent devices 110. In an embodiment, the Insteon® connect web services comprises the connect server 130.

Referring to FIG. 4, the intelligent device 110 communicates with the messaging server 120 and the connect server 130. The intelligent device 110 is remote from the network 200, or in other words, the intelligent device 110 is not part of the network 200. In an embodiment, the intelligent device 110 comprises a personal computer, a laptop, a notebook, a tablet, a smartphone, or the like, and interfaces with a user. In another embodiment, the intelligent device 110 comprises a user-operated device configured to operate with a client application and comprising a mobile operating system, such as, for example, Android, iOS, and the like, home automation desktop software, such as HouseLinc™ and the like, websites, or the like. In an embodiment, the intelligent device 110 runs an application that enables the user through the intelligent device 110 to send commands to the network controller 250 to control the devices 220 on the network 200 and to receive responses or status from the devices 220 via the network controller 250.

In the embodiment illustrated in FIG. 4, the network controller 250 is web-enabled and is configured to communicate with the messaging server 120 and the connect server 130 over a global network, such as the Internet.

Further, the network controller 250, the connect server 130 and the intelligent device 110 are configured to communicate over private networks formed as a subset of the Internet through the messaging service and the messaging server 120. In an embodiment, the messaging server 120 provides a communication platform for communications between the connect server 130 and the network controller 250 and a communication platform between the intelligent device 110 and the network controller 250.

The installation system 150 is configured to provide a secure and robust platform to communicate with the network controller 250. The messaging server 120 provides a communication platform that permits the network controller 250 to maintain a persistent connection to send and receive multiple requests/responses between the network controller 250, at least one intelligent device 110, and the connect server 130.

Network

Figure 7:
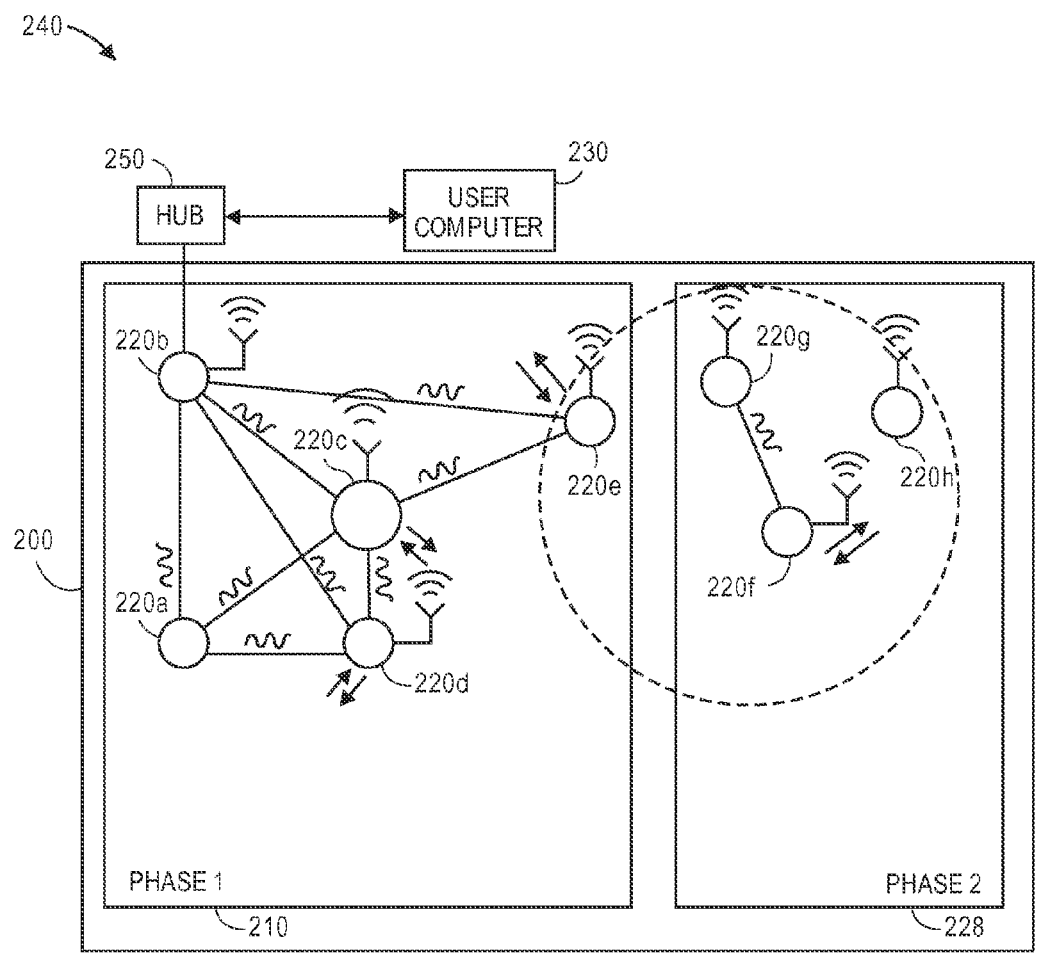
FIG. 7 is a block diagram of a powerline and radio frequency (RF) communication network, according to certain embodiments.

FIG. 7 illustrates an embodiment of a communication system 240 comprising the network 200, the network controller or hub 250, and the user computer 230. The communication system 240 is configured to propagate data and/or commands from the network controller or hub 250 to network devices 220 and to propagate messages from the network devises 220 to the network controller or hub 250.

In an embodiment, the network 200 comprises a dual-band mesh area networking topology to communicate with devices 220 located within the network 200. In an embodiment, the network 200 comprises an INSTEON® network utilizing an INSTEON® engine employing a powerline protocol and an RF protocol. The network devices 220 can comprise, for example, light switches, thermostats, motion sensors, and the like. INSTEON® devices are peers, meaning each network device 220 can transmit, receive, and repeat any message of the INSTEON® protocol, without requiring a master controller or routing software.

FIG. 7 illustrates the communication network 200 of control and communication devices 220 communicating over the network 200 using one or more of powerline signaling and RF signaling. In an embodiment, the communication network 200 comprises a mesh network. In another embodiment, the communication network 200 comprises a simulcast mesh network. In a further embodiment, the communication network 200 comprises an INSTEON® network.

Electrical power is most commonly distributed to buildings and homes in North America as single split-phase alternating current. At the main junction box to the building, the three-wire single-phase distribution system is split into two two-wire 110 VAC powerlines, known as Phase 1 and Phase 2. Phase 1 wiring is typically used for half the circuits in the building and Phase 2 is used for the other half. In the exemplary network 200, network devices 220a-220e are connected to a Phase 1 powerline 210 and network devices 220f-220h are connected to a Phase 2 powerline 228.

In the network 200, network device 220a is configured to communicate over the powerline; network device 220h is configured to communicate via RF; and network devices 220b-220g are configured to communicate over the powerline and via RF. Additionally network device 220b can be configured to communicate to the network controller or hub 250 and the network controller or hub 250 can be configured to communicate with the computer 230 and other digital equipment using, for example, RS232, USB, IEEE 802.3, or Ethernet protocols and communication hardware. The network controller or hub 250 on the network 200 communicating with the computer 230 and other digital devices can, for example, bridge to networks of otherwise incompatible devices in a building, connect to computers, act as nodes on a local-area network (LAN), or get onto the global Internet. In an embodiment, the computer 230 comprises a personal computer, a laptop, a tablet, a smartphone, or the like, and interfaces with a user. The network controller or hub 250 can further be configured to provide information to a user through the computer 230.

In an embodiment, network devices 220a-220g that send and receive messages over the powerline use the INSTEON® Powerline protocol, and network devices 220b-220h that send and receive radio frequency (RF) messages use the INSTEON® RF protocol, as defined in U.S. Pat. Nos. 7,345,998 and 8,081,649 which are hereby incorporated by reference herein in their entireties. INSTEON® is a trademark of the applicant.

Network devices 220*b*-220*h* that use multiple media or layers solve a significant problem experienced by devices that only communicate via the powerline, such as network device 220*a*, or by devices that only communicate via RF, such as network device 220*h*. Powerline signals on opposite powerline phases 210 and 228 are severely attenuated because there is no direct circuit connection for them to travel over. RF barriers can prevent direct RF communication between devices RF only devices. Using devices capable of communicating over two or more of the communication layers solves the powerline phase coupling problem whenever such devices are connected on opposite powerline phases and solves problems with RF barriers between RF devices. Thus, within the network 200, the powerline layer assists the RF layer, and the RF layer assists the powerline layer.

As shown in FIG. 7, network device 220*a* is installed on powerline Phase 1 210 and network device 220*f* is installed on powerline Phase 2 228. Network device 220*a* can communicate via powerline with network devices 220*b*-220*e* on powerline Phase 1 210, but it can also communicate via powerline with network device 220*f* on powerline Phase 2 228 because it can communicate over the powerline to network device 220*e*, which can communicate to network device 220*f* using RF signaling, which in turn is directly connected to powerline Phase 2 228. The dashed circle around network device 220*f* represents the RF range of network device 220*f*. Direct RF paths between network devices 220*e* to 220*f* (1 hop), for example, or indirect paths between network devices 220*c* to 220*e* and between network devices 220*e* to 220*f*, for example (2 hops) allow messages to propagate between the powerline phases.

Each network device 220*a*-220*h* is configured to repeat messages to others of the network devices 220*a*-220*h* on the network 200. In an embodiment, each network device 220*a*-220*h* is capable of repeating messages, using the protocols as described herein. Further, the network devices 220*a*-220*h* are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination.

For example, RF network device 220*d* desires to send a message to network device 220*e*, but network device 220*e* is out of range. The message will still get through, however, because devices within range of network device 220*d*, such as network devices 220*a*-220*c* will receive the message and repeat it to other devices within their respective ranges. There are many ways for a message to travel: network device 220*d* to 220*c* to 220*e* (2 hops), network device 220*d* to 220*a* to 220*c* to 220*e* (3 hops), network device 220*d* to 220*b* to 220*a* to 220*c* to 220*e* (4 hops) are some examples.

Figure 8:
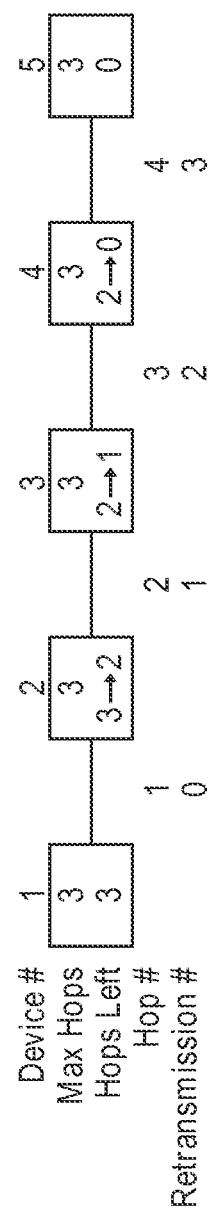
FIG. 8 is a block diagram illustrating message retransmission within the network, according to certain embodiments.

FIG. 8 is a block diagram illustrating message retransmission within the communication network 200. In order to improve network reliability, the network devices 220 retransmit messages intended for other devices on the network 200. This increases the range that the message can travel to reach its intended device recipient.

Unless there is a limit on the number of hops that a message may take to reach its final destination, messages might propagate forever within the network 200 in a nested series of recurring loops. Network saturation by repeating messages is known as a "data storm." The message protocol avoids this problem by limiting the maximum number of hops an individual message may take to some small number.

In an embodiment, messages can be retransmitted a maximum of three times. In other embodiments, the number of times a message can be retransmitted is less than 3. In further embodiments, the number of times a message can be retransmitted is greater than 3. The larger the number of retransmissions, however, the longer the message will take to complete.

Embodiments comprise a pattern of transmissions, retransmissions, and acknowledgements that occurs when messages are sent. Message fields, such as Max Hops and Hops Left, manage message retransmission. In an embodiment, messages originate with the 2-bit Max Hops field set to a value of 0, 1, 2, or 3, and the 2-bit Hops Left field set to the same value. A Max Hops value of zero tells other network devices 220 within range not to retransmit the message. A higher Max Hops value tells network devices 220 receiving the message to retransmit it depending on the Hops Left field. If the Hops Left value is one or more, the receiving device 220 decrements the Hops Left value by one and retransmits the message with the new Hops Left value. Network devices 220 that receive a message with a Hops Left value of zero will not retransmit that message. Also, the network device 220 that is the intended recipient of a message will not retransmit the message, regardless of the Hops Left value.

In other words, Max Hops is the maximum retransmissions allowed. All messages "hop" at least once, so the value in the Max Hops field is one less than the number of times a message actually hops from one device to another. In embodiments where the maximum value in this field is three, there can be four actual hops, comprising the original transmission and three retransmissions. Four hops can span a chain of five devices. This situation is shown schematically in FIG. 8.

Figure 9:
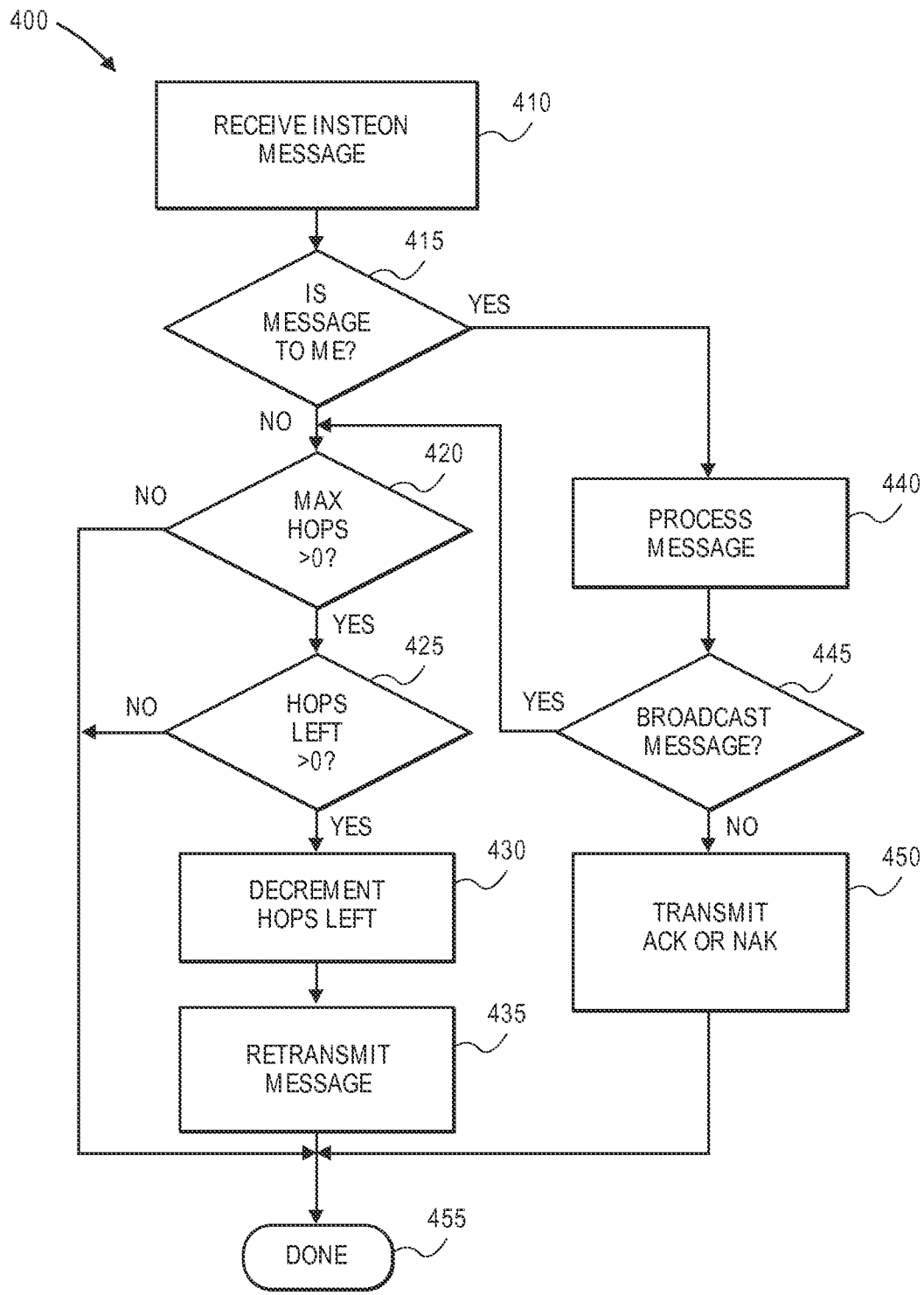
FIG. 9 illustrates a process to receive messages within the network, according to certain embodiments.

FIG. 9 illustrates a process 400 to receive messages within the communication network 200. The flowchart in FIG. 9 shows how the network device 220 receives messages and determines whether to retransmit them or process them. At step 410, the network device 220 receives a message via powerline or RF.

At step 415, the process 400 determines whether the network device 220 needs to process the received message. The network device 220 processes Direct messages when the network device 220 is the addressee, processes Group Broadcast messages when the network device 220 is a member of the group, and processes all Broadcast messages.

If the received message is a Direct message intended for the network device 220, a Group Broadcast message where the network device 220 is a group member, or a Broadcast message, the process 400 moves to step 440. At step 440, the network device 220 processes the received message.

At step 445, the process 400 determines whether the received message is a Group Broadcast message or one of a Direct message and Direct group-cleanup message. If the message is a Direct or Direct Group-cleanup message, the process moves to step 450. At step 450, the device sends an acknowledge (ACK) or a negative acknowledge (NAK) message back to the message originator in step 450 and ends the task at step 455.

In an embodiment, the process 400 simultaneously sends the ACK/NAK message over the powerline and via RF. In another embodiment, the process 400 intelligently selects which physical layer (powerline, RF) to use for ACK/NAK message transmission. In a further embodiment, the process 400 sequentially sends the ACK/NAK message using a different physical layer for each subsequent retransmission.

If at step 445, the process 400 determines that the message is a Broadcast or Group Broadcast message, the process 400 moves to step 420. If, at step 415, the process 400 determines that the network device 220 does not need to process the received message, the process 400 also moves to step 420. At step 420, the process 400 determines whether the message should be retransmitted.

At step 420, the Max Hops bit field of the Message Flags byte is tested. If the Max Hops value is zero, process 400 moves to step 455, where it is finished. If the Max Hops filed is not zero, the process 400 moves to step 425, where the Hops Left filed is tested.

If there are zero Hops Left, the process 400 moves to step 455, where it is finished. If the Hops Left field is not zero, the process 400 moves to step 430, where the process 400 decrements the Hops Left value by one.

At step 435, the process 400 retransmits the message. In an embodiment, the process 400 simultaneously retransmits the message over the powerline and via RF. In another embodiment, the process 400 intelligently selects which physical layer (PL, RF) to use for message retransmission. In a further embodiment, the process 400 sequentially retransmits the message using a different physical layer for each subsequent retransmission.

Figures 10, 11:
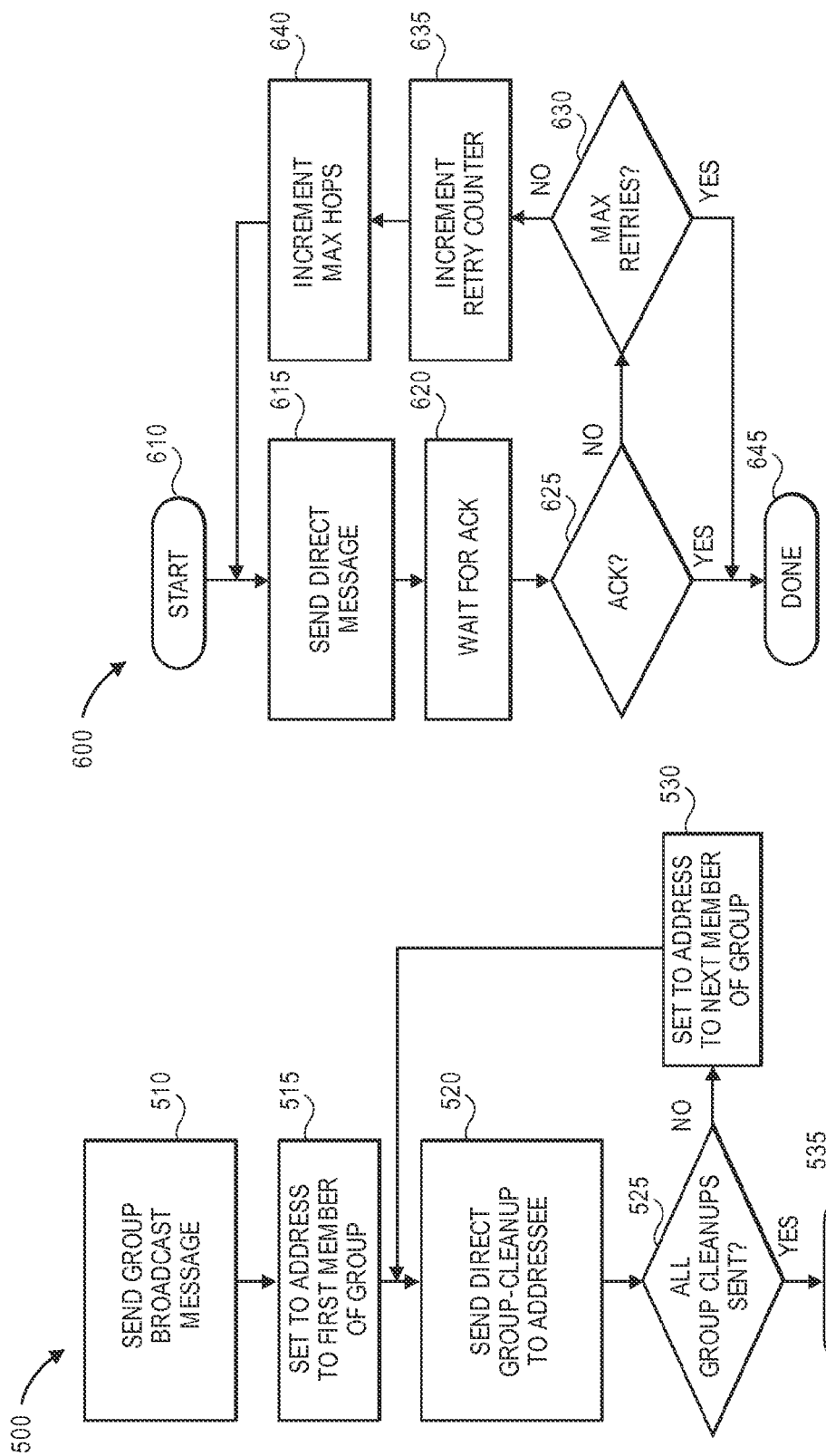
FIG. 10 illustrates a process to transmit messages to groups of network devices within the network, according to certain embodiments.
FIG. 11 illustrates a process to transmit direct messages with retries to network devices within the network, according to certain embodiments.

FIG. 10 illustrates a process 500 to transmit messages to multiple recipient devices 220 in a group within the communication network 200. Group membership is stored in a database in the network device 220 following a previous enrollment process. At step 510, the network device 220 first sends a Group Broadcast message intended for all members of a given group. The Message Type field in the Message Flags byte is set to signify a Group Broadcast message, and the To Address field is set to the group number, which can range from 0 to 255. The network device 220 transmits the message using at least one of powerline and radio frequency signaling. In an embodiment, the network device 220 transmits the message using both powerline and radio frequency signaling.

Following the Group Broadcast message, the transmitting device 220 sends a Direct Group-cleanup message individually to each member of the group in its database. At step 515, the network device 220 first sets the message To Address to that of the first member of the group, then it sends a Direct Group-cleanup message to that addressee at step 520. If Group-cleanup messages have been sent to every member of the group, as determined at step 525, transmission is finished at step 535. Otherwise, the network device 220 sets the message To Address to that of the next member of the group and sends the next Group-cleanup message to that addressee at step 520.

FIG. 11 illustrates a process 600 to transmit direct messages with retries to the network device 220 within the communication network 200. Direct messages can be retried multiple times if an expected ACK is not received from the addressee. The process begins at step 610.

At step 615, the network device 220 sends a Direct or a Direct Group-cleanup message to an addressee. At step 620, the network device 220 waits for an Acknowledge message from the addressee. If, at step 625, an Acknowledge message is received and it contains an ACK with the expected status, the process 600 is finished at step 645.

If, at step 625, an Acknowledge message is not received, or if it is not satisfactory, a Retry Counter is tested at step 630. If the maximum number of retries has already been attempted, the process 600 fails at step 645. In an embodiment, network devices 220 default to a maximum number of retries of five. If fewer than five retries have been tried at step 630, the network device 220 increments its Retry Counter at step 635. At step 640, the network device 220 will also increment the Max Hops field in the Message Flags byte, up to a maximum of three, in an attempt to achieve greater range for the message by retransmitting it more times by more network devices 220. The message is sent again at step 615.

The network devices 220 comprise hardware and firmware that enable the network devices 220 to send and receive messages. FIG. 12 is a block diagram 700 of the network device 220 illustrating the overall flow of information related to sending and receiving messages. Received signals 710 come from the powerline, via radio frequency, or both. Signal conditioning circuitry 715 processes the raw signal and converts it into a digital bitstream. Message receiver firmware 720 processes the bitstream as required and places the message payload data into a buffer 725, which is available to the application running on the network device 220. A message controller 750 tells the application that data is available using control flags 755.

To send a message, the application places message data in a buffer 745, then tells the message controller 750 to send the message using the control flags 755. Message transmitter 740 processes the message into a raw bitstream, which it feeds to a modem transmitter 735. The modem transmitter 735 sends the bitstream as a powerline signal, a radio frequency signal, or both.

Figure 13:
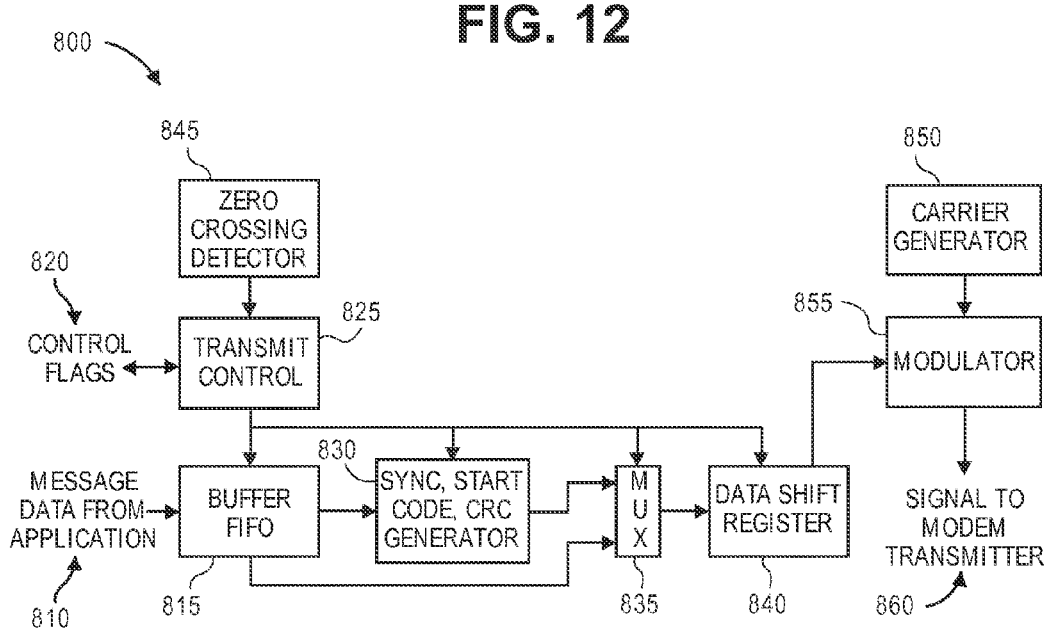
FIG. 13 is a block diagram illustrating the overall flow of information related to transmitting messages on the powerline, according to certain embodiments.

FIG. 13 shows a powerline message transmitter 800 in detail and illustrates sending a message on the powerline. The application first composes a message 810 to be sent, excluding the cyclic redundancy check (CRC) byte, and puts the message data in a transmit buffer 815. The application then tells a transmit controller 825 to send the message by setting appropriate control flags 820. The transmit controller 825 packetizes the message data using multiplexer 835 to put sync bits and a start code from a generator 830 at the beginning of a packet followed by data shifted out of the first-in first-out (FIFO) transmit buffer 815.

As the message data is shifted out of FIFO transmit buffer 815, the CRC generator 830 calculates the CRC byte, which is appended to the bitstream by the multiplexer 835 as the last byte in the last packet of the message. The bitstream is buffered in a shift register 840 and clocked out in phase with the powerline zero crossings detected by zero crossing detector 845. The phase shift keying (PSK) modulator 855 shifts the phase of an approximately 131.65 kHz carrier signal from carrier generator 850 by approximately 180 degrees for zero-bits, and leaves the carrier signal unmodulated for one-bits. In other embodiments, the carrier signal can be greater than or less than approximately 131.65 kHz. Note that the phase is shifted gradually over one carrier period as disclosed in conjunction with FIG. 16. Finally, the modulated carrier signal is applied to the powerline by the modem transmit circuitry 735 of FIG. 12.

Figure 14:
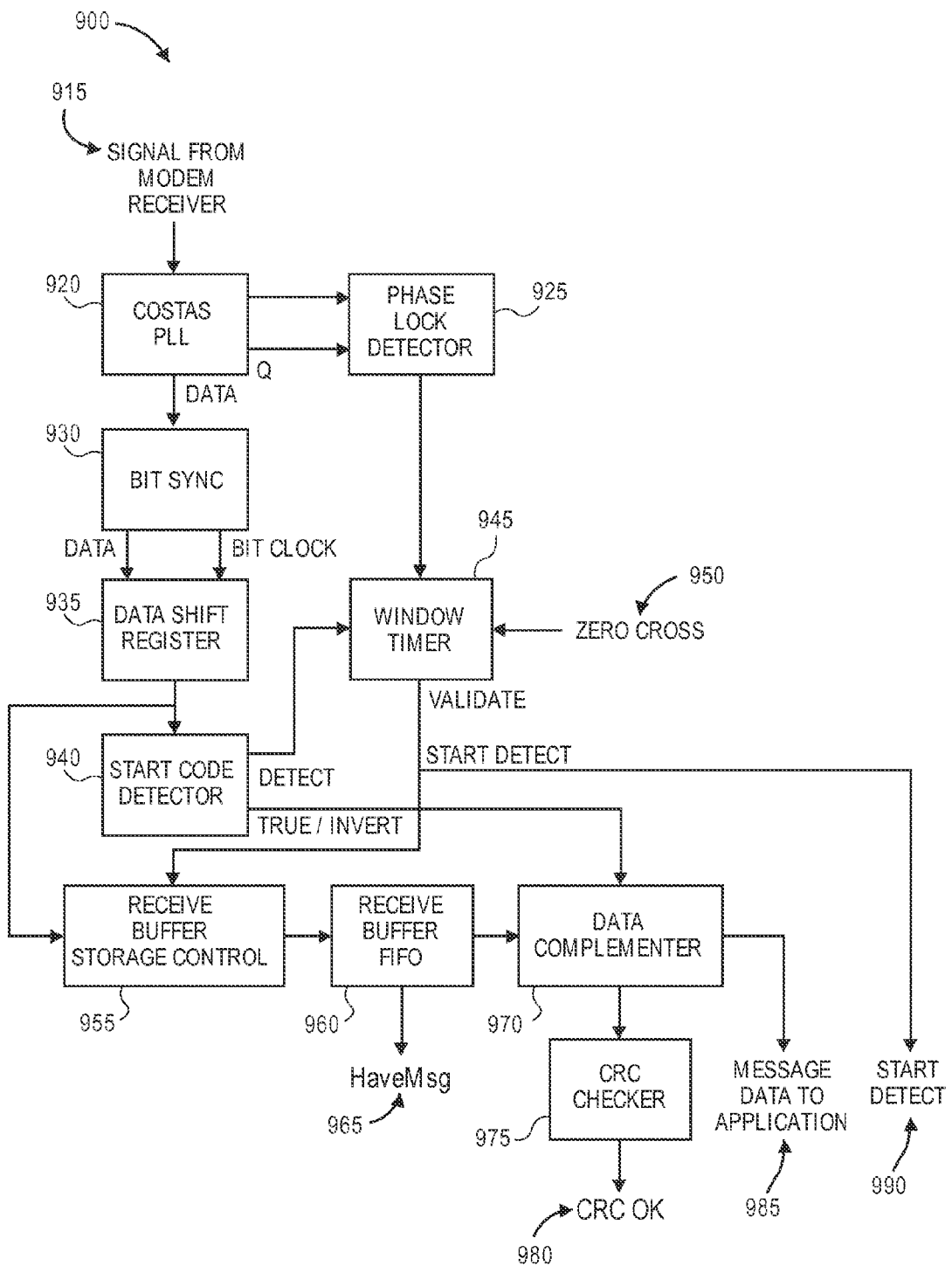
FIG. 14 is a block diagram illustrating the overall flow of information related to receiving messages from the powerline, according to certain embodiments.

FIG. 14 shows a powerline message receiver 900 and illustrates receiving a message from the powerline. The modem receive circuitry 715 of FIG. 12 conditions the signal on the powerline and transforms it into a digital data stream 915 that the firmware in FIG. 14 processes to retrieve messages. Raw data from the powerline is typically very noisy, because the received signal amplitude can be as low as only few millivolts, and the powerline often carries high-energy noise spikes or other noise of its own. Therefore, in an embodiment, a Costas phase-locked-loop (PLL) 920, implemented in firmware, is used to find the PSK signal within the noise. Costas PLLs, well known in the art, phase-lock to a signal both in phase and in quadrature. A phase-lock detector 925 provides one input to a window timer 945, which also receives a zero crossing signal 950 and an indication that a start code in a packet has been found by start code detector 940.

Whether it is phase-locked or not, the Costas PLL 920 sends data to the bit sync detector 930. When the sync bits of alternating ones and zeroes at the beginning of a packet arrive, the bit sync detector 930 will be able to recover a bit clock, which it uses to shift data into data shift register 935. The start code detector 940 looks for the start code following the sync bits and outputs a detect signal to the window timer 945 after it has found one. The window timer 945 determines that a valid packet is being received when the data stream begins approximately 800 microseconds before the powerline zero crossing, the phase lock detector 925 indicates lock, and detector 940 has found a valid start code. At that point the window timer 945 sets a start detect flag 990 and enables the receive buffer controller 955 to begin accumulating packet data from shift register 935 into the FIFO receive buffer 960. The storage controller 955 insures that the FIFO 960 builds up the data bytes in a message, and not sync bits or start codes. It stores the correct number of bytes, 10 for a standard message and 24 for an extended message, for example, by inspecting the Extended Message bit in the Message Flags byte. When the correct number of bytes has been accumulated, a HaveMsg flag 965 is set to indicate a message has been received.

Costas PLLs have a phase ambiguity of 180 degrees, since they can lock to a signal equally well in phase or anti-phase. Therefore, the detected data from PLL 920 may be inverted from its true sense. The start code detector 940 resolves the ambiguity by looking for the true start code, C3 hexadecimal, and its complement, 3C hexadecimal. If it finds the complement, the PLL is locked in antiphase and the data bits are inverted. A signal from the start code detector 940 tells the data complementer 970 whether to un-invert the data or not. The CRC checker 975 computes a CRC on the received data and compares it to the CRC in the received message. If they match, the CRC OK flag 980 is set.

Data from the complementer 970 flows into an application buffer, not shown, via path 985. The application will have received a valid message when the HaveMsg flag 965 and the CRC OK flag 980 are both set.

Figure 15:
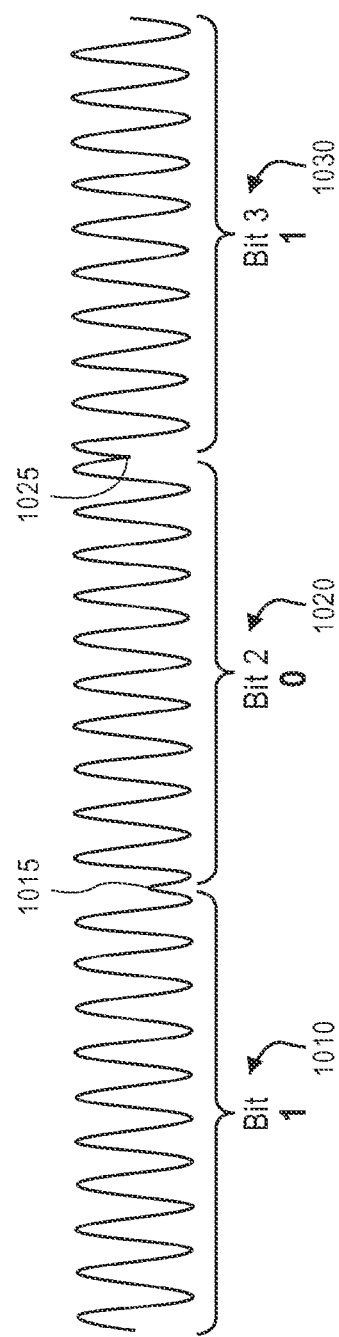
FIG. 15 illustrates a powerline signal, according to certain embodiments.

FIG. 15 illustrates an exemplary 131.65 kHz powerline carrier signal with alternating BPSK bit modulation. Each bit uses ten cycles of carrier. Bit 1010, interpreted as a one, begins with a positive-going carrier cycle. Bit 2 1020, interpreted as a zero, begins with a negative-going carrier cycle. Bit 3 1030, begins with a positive-going carrier cycle, so it is interpreted as a one. Note that the sense of the bit interpretations is arbitrary. That is, ones and zeroes could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ or nonreturn to zero.

FIG. 15 shows abrupt phase transitions of 180 degrees at the bit boundaries 1015 and 1025. Abrupt phase transitions introduce troublesome high-frequency components into the signal's spectrum. Phase-locked detectors can have trouble tracking such a signal. To solve this problem, the powerline encoding process uses a gradual phase change to reduce the unwanted frequency components.

Figure 16:
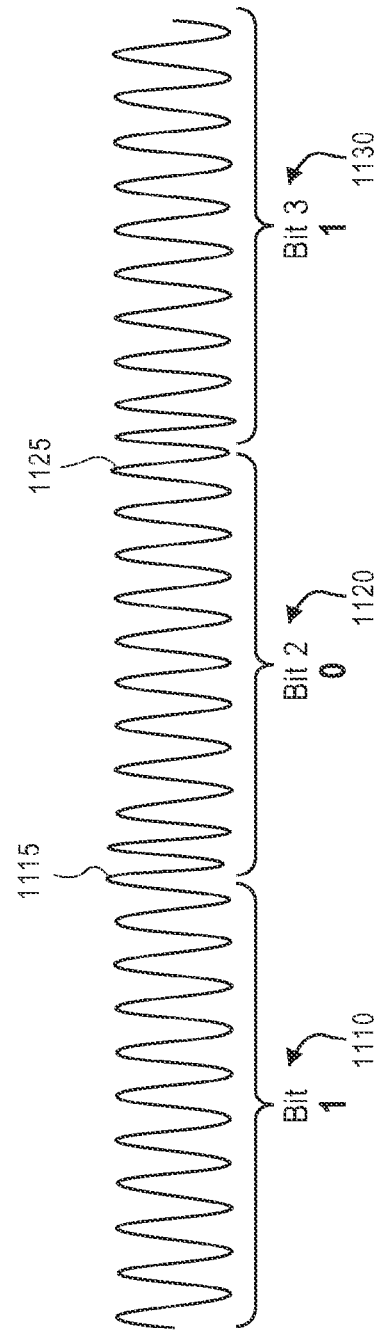
FIG. 16 illustrates a powerline signal with transition smoothing, according to certain embodiments.

FIG. 16 illustrates the powerline BPSK signal of FIG. 15 with gradual phase shifting of the transitions. The transmitter introduces the phase change by inserting approximately 1.5 cycles of carrier at 1.5 times the approximately 131.65 kHz frequency. Thus, in the time taken by one cycle of 131.65 kHz, three half-cycles of carrier will have occurred, so the phase of the carrier is reversed at the end of the period due to the odd number of half-cycles. Note the smooth transitions 1115 and 1125.

In an embodiment, the powerline packets comprise 24 bits. Since a bit takes ten cycles of 131.65 kHz carrier, there are 240 cycles of carrier in a packet, meaning that a packet lasts approximately 1.823 milliseconds. The powerline environment is notorious for uncontrolled noise, especially high-amplitude spikes caused by motors, dimmers, and compact fluorescent lighting. This noise is minimal during the time that the current on the powerline reverses direction, a time known as the powerline zero crossing. Therefore, the packets are transmitted near the zero crossing.

Figure 17:
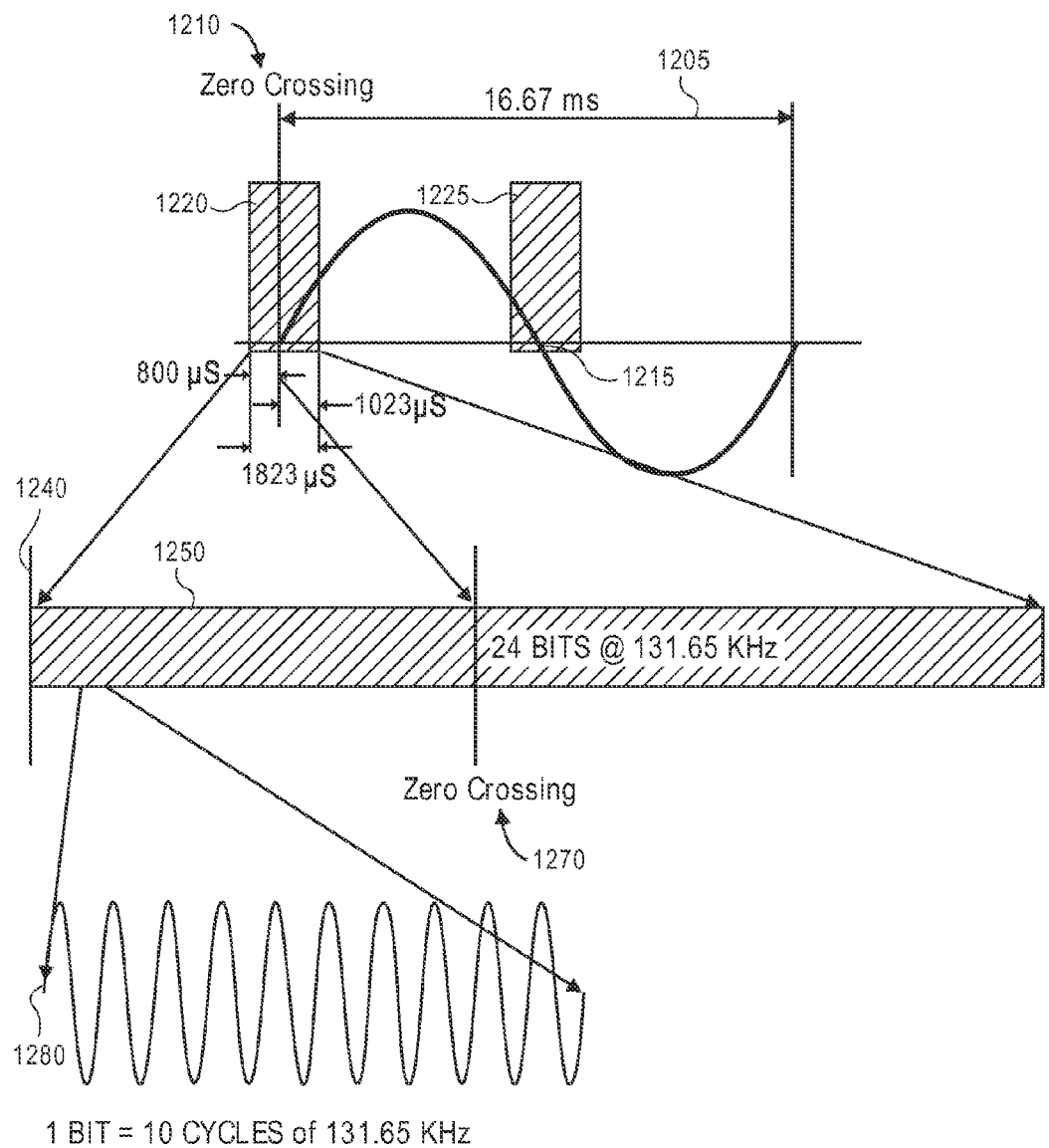
FIG. 17 illustrates powerline signaling applied to the powerline, according to certain embodiments.

FIG. 17 illustrates powerline signaling applied to the powerline. Powerline cycle 1205 possesses two zero crossings 1210 and 1215. A packet 1220 is at zero crossing 1210 and a second packet 1225 is at zero crossing 1215. In an embodiment, the packets 1220, 1225 begin approximately 800 microseconds before a zero crossing and last until approximately 1023 microseconds after the zero crossing.

In some embodiments, the powerline transmission process waits for one or two additional zero crossings after sending a message to allow time for potential RF retransmission of the message by network devices 220.

Figure 18:
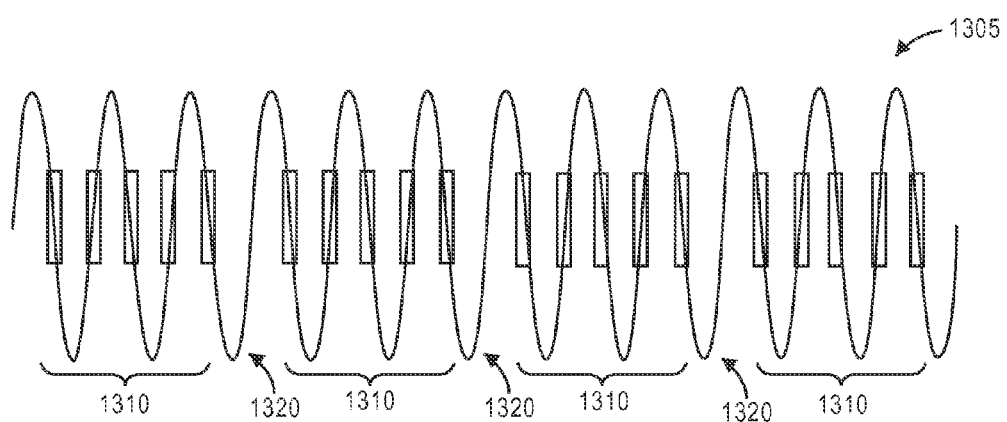
FIG. 18 illustrates standard message packets applied to the powerline, according to certain embodiments.
Figure 19:
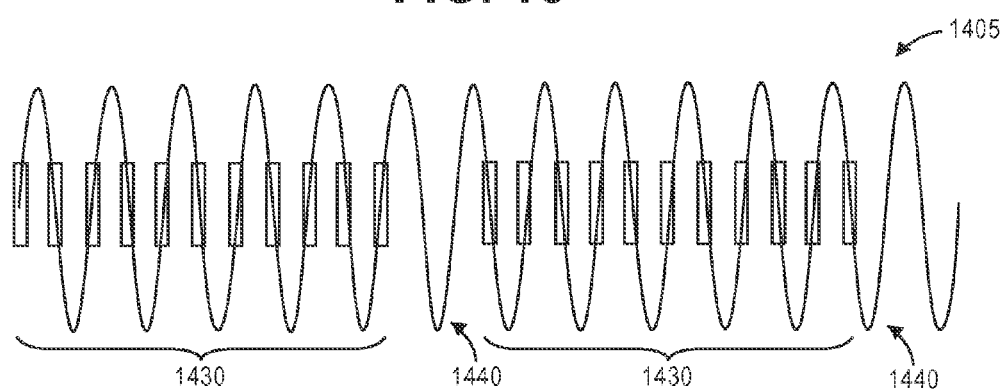
FIG. 19 illustrates extended message packets applied to the powerline, according to certain embodiments.

FIG. 18 illustrates an exemplary series of five-packet standard messages 1310 being sent on powerline signal 1305. In an embodiment, the powerline transmission process waits for at least one zero crossing 1320 after each standard message 1310 before sending another packet. FIG. 19 illustrates an exemplary series of eleven-packet extended messages 1430 being sent on the powerline signal 1405. In another embodiment, the powerline transmission process waits for at least two zero crossings 1440 after each extended message before sending another packet. In other embodiments, the powerline transmission process does not wait for extra zero crossings before sending another packet.

In some embodiments, standard messages contain 120 raw data bits and use six zero crossings, and take approximately 50 milliseconds to send. In some embodiments, extended messages contain 264 raw data bits and use thirteen zero crossings, and take approximately 108.33 milliseconds to send. Therefore, the actual raw bitrate is approximately 2,400 bits per second for standard messages 1310, and approximately 2,437 bits per second for extended messages 1430, instead of the 2880 bits per second the bitrate would be without waiting for the extra zero crossings 1320, 1440.

In some embodiments, standard messages contain 9 bytes (72 bits) of usable data, not counting packet sync and start code bytes, and not counting the message CRC byte. In some embodiments, extended messages contain 23 bytes (184 bits) of usable data using the same criteria. Therefore, the bitrates for usable data are further reduced to 1440 bits per second for standard messages 1310 and 1698 bits per second for extended messages 1430. Counting only the 14 bytes (112 bits) of User Data in extended messages, the User Data bitrate is 1034 bits per second.

The network devices 220 can send and receive the same messages that appear on the powerline using radio frequency signaling. Unlike powerline messages, however, messages sent by radio frequency are not broken up into smaller packets sent at powerline zero crossings, but instead are sent whole. As with powerline, in an embodiment, there are two radio frequency message lengths: standard 10-byte messages and extended 24-byte messages.

Figure 20:
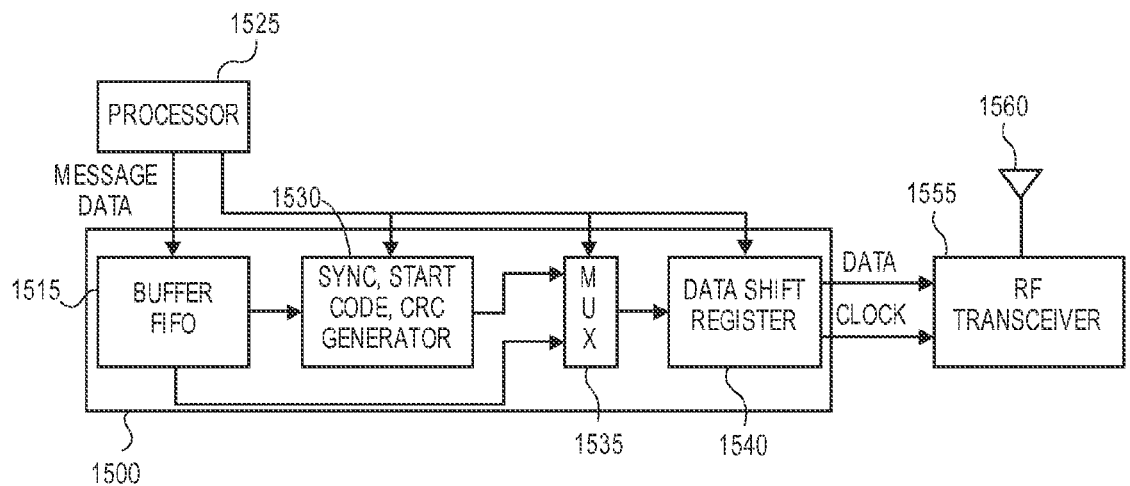
FIG. 20 is a block diagram illustrating the overall flow of information related to transmitting radio frequency (RF) messages, according to certain embodiments.

FIG. 20 is a block diagram illustrating message transmission using radio frequency (RF) signaling comprising processor 1525, RF transceiver 1555, antenna 1560, and RF transmit circuitry 1500. The RF transmit circuitry 1500 comprises a buffer FIFO 1525, a generator 1530, a multiplexer 1535, and a data shift register 1540.

The steps are similar to those for sending powerline messages in FIG. 13, except that radio frequency messages are sent all at once in a single packet. In FIG. 20, the processor 1525 composes a message to send, excluding the CRC byte, and stores the message data into the transmit buffer 1515. The processor 1525 uses the multiplexer 1535 to add sync bits and a start code from the generator 1530 at the beginning of the radio frequency message followed by data shifted out of the first-in first-out (FIFO) transmit buffer 1515.

As the message data is shifted out of FIFO 1515, the CRC generator 1530 calculates the CRC byte, which is appended to the bitstream by the multiplexer 1535 as the last byte of the message. The bitstream is buffered in the shift register 1540 and clocked out to the RF transceiver 1555. The RF transceiver 1555 generates an RF carrier, translates the bits in the message into Manchester-encoded symbols, frequency modulates the carrier with the symbol stream, and transmits the resulting RF signal using antenna 1560. In an embodiment, the RF transceiver 1555 is a single-chip hardware device and the other steps in FIG. 20 are implemented in firmware running on the processor 1525.

Figure 21:
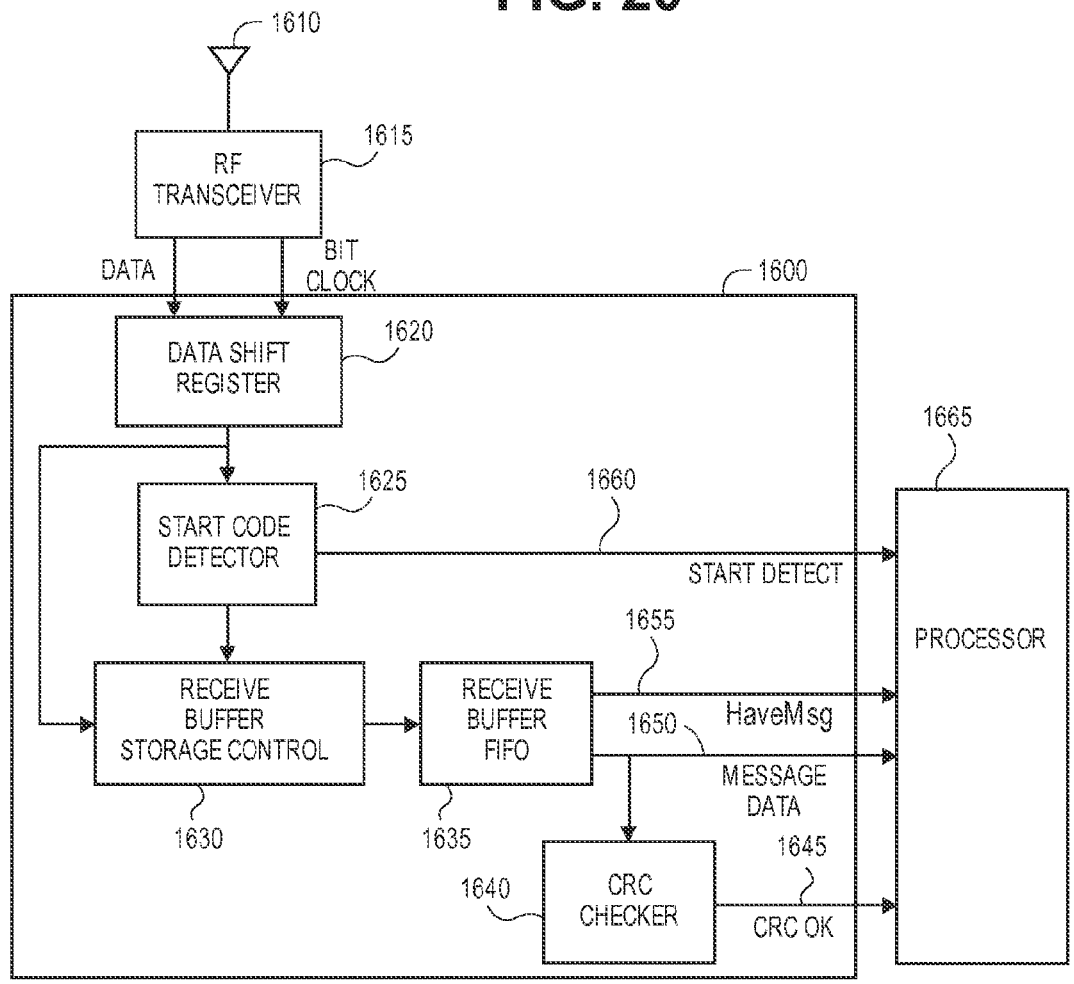
FIG. 21 is a block diagram illustrating the overall flow of information related to receiving radio frequency (RF) messages, according to certain embodiments.

FIG. 21 is a block diagram illustrating message reception using the radio frequency signaling comprising processor 1665, RF transceiver 1615, antenna 1610, and RF receive circuitry 1600. The RF receive circuitry 1600 comprises a shift register 1620, a code detector 1625, a receive buffer storage controller 1630, a buffer FIFO 1635, and a CRC checker 1640.

The steps are similar to those for receiving powerline messages given in FIG. 14 except that radio frequency messages are sent all at once in a single packet. In FIG. 21, the RF transceiver 1615 receives an RF transmission from antenna 1610 and frequency demodulates it to recover the baseband Manchester symbols. The sync bits at the beginning of the message allow the transceiver 1615 to recover a bit clock, which it uses to recover the data bits from the Manchester symbols. The transceiver 1615 outputs the bit clock and the recovered data bits to shift register 1620, which accumulates the bitstream in the message.

The start code detector 1625 looks for the start code following the sync bits at the beginning of the message and outputs a detect signal 1660 to the processor 1665 after it has found one. The start detect flag 1660 enables the receive buffer controller 1630 to begin accumulating message data from shift register 1620 into the FIFO receive buffer 1635. The storage controller 1630 insures that the FIFO receive buffer 1635 stores the data bytes in a message, and not the sync bits or start code. In an embodiment, the storage controller 1630 stores 10 bytes for a standard message and 24 for an extended message, by inspecting the Extended Message bit in the Message Flags byte.

When the correct number of bytes has been accumulated, a HaveMsg flag 1655 is set to indicate a message has been received. The CRC checker 1640 computes a CRC on the received data and compares it to the CRC in the received message. If they match, the CRC OK flag 1645 is set. When the HaveMsg flag 1655 and the CRC OK flag 1645 are both set, the message data is ready to be sent to processor 1665.

In an embodiment, the RF transceiver 1615 is a single-chip hardware device and the other steps in FIG. 21 are implemented in firmware running on the processor 1665.

FIG. 22 is a table 1700 of exemplary specifications for RF signaling within the communication network 200. In an embodiment, the center frequency lies in the band of approximately 902 to 924 MHz, which is permitted for non-licensed operation in the United States. In certain embodiments, the center frequency is approximately 915 MHz. Each bit is Manchester encoded, meaning that two symbols are sent for each bit. A one-symbol followed by a zero-symbol designates a one-bit, and a zero-symbol followed by a one-symbol designates a zero-bit.

Symbols are modulated onto the carrier using frequency-shift keying (FSK), where a zero-symbol modulates the carrier by half of the FSK deviation frequency downward and a one-symbol modulates the carrier by half of the FSK deviation frequency upward. The FSK deviation frequency is approximately 64 kHz. In other embodiments, the FSK deviation frequency is between approximately 100 kHz and 200 kHz. In other embodiments, the FSK deviation frequency is less than 64 kHz. In further embodiment, the FSK deviation frequency is greater than 200 kHz. Symbols are modulated onto the carrier at approximately 38,400 symbols per second, resulting in a raw data rata of half that, or 19,200 bits per second. The typical range for free-space reception is 150 feet, which is reduced in the presence of walls and other RF energy absorbers.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK, BPSK, QPSK), and the like, could be used.

Network devices 220 transmit data with the most-significant bit sent first. In an embodiment, RF messages begin with two sync bytes comprising AAAA in hexadecimal, followed by a start code byte of C3 in hexadecimal. Ten data bytes follow in standard messages, or twenty-four data bytes in extended messages. The last data byte in a message is a CRC over the data bytes as disclosed above.

Other Embodiments

Daylight Harvesting

In another embodiment, the sensor module 220SEN is aware of the ambient light verses the illumination from the light 220LED. The sensor module 220SEN then enables the amount of light needed to reach a desired level, not more, to save energy.

Party Mode

In another embodiment, it is not desirable to turn OFF the light 220LED when the countdown timer reaches a preset time. The user could configure the light 220LED to ignore motion activated ON and OFF events through network device 220, such as a wall switch, a button on a key pad, and the like. The sensor module 220SEN queries the user selected network device 220 to determine whether the user disabled the motion sensing function. Thus, the user can control the sensor module's automatic function through a network wall switch or a button on a network key pad.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize. For example, while processes, steps, or blocks are presented in a given order, alternative embodiments may perform routines having steps, or employ systems having blocks, in a different order, and some processes, steps, or blocks may be deleted, moved, added, subdivided, combined, and/or modified. Each of these processes, steps, or blocks may be implemented in a variety of different ways. Also, while processes, steps, or blocks are at times shown as being performed in series, these processes, steps, or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method to automatically control lighting on a home-control network, the method comprising:
    automatically transmitting over a home-control network a lighting control command from a sensor module to control a state of a light, the home-control network configured to propagate the lighting control command, the lighting control command being one of an ON command and an OFF command;
    detecting motion and ambient light with the sensor module;
    transmitting the ON command through the home-control network and starting a timer having a timer count in response to detected motion when the ambient light is less than a threshold;
    determining whether the light is OFF, the light being further controlled independently of the sensor module by a switch configured to send the lighting control commands over the home-control network in response to a physical input by a user; and
    setting the timer count to an end count when the light is OFF in response to the physical input by the user.

2. The method of claim 1 further comprising setting the timer count to a start count when the light is ON and motion is detected.

3. The method of claim 2 further comprising transmitting the OFF command through the home-control network when the light is ON, the timer times out, and no motion is detected.

4. The method of claim 1 wherein receipt of the ON command causes the light to illuminate to a percentage of illumination capability that is stored in memory.

5. The method of claim 1 further comprising receiving a message over the home-control network comprising the threshold, wherein the threshold is user settable.

6. The method of claim 1 further comprising determining whether the light is OFF by receiving and decoding a message transmitted over the home-control network, the message being transmitted in response to the physical input by the user and comprising the state of the light.

7. The method of claim 1 further comprising determining whether the light is OFF by detecting the ambient light and comparing the detected ambient light to the threshold.

8. A system to automatically control lighting on a home-control network, the system comprising:
    a sensor module configured to automatically transmit over a home-control network a first lighting control command to control a state of a light;
    a switch configured to transmit over the home-control network a second lighting control command to control the light in response to a manual input from a user, the home-control network configured to propagate the first and second lighting control commands, the first and second lighting control commands being one of an ON command and an OFF command;
    a lighting module comprising the light and configured to receive the first and second lighting control commands over the home-control network and turn ON the light or turn OFF the light in response to the first and second lighting control commands;
    a motion sensor configured to detect motion in an area proximate to the lighting module; and
    a light detector configured to detect ambient light in the area proximate to the lighting module;
    the sensor module further configured to send the ON command to the lighting module and start a timer having a timer count when the motion is detected and a level of the ambient light is below a threshold, the sensor module further configured set the timer count to an end count when the lighting module receives the OFF command from the switch.

9. The system of claim 8 wherein the sensor module is further configured to set the timer count to a start count when the light is ON and the motion is detected.

10. The system of claim 9 wherein the sensor module is further configured to transmit the OFF command over the home-control network when the light is ON, the timer times out, and no motion is detected.

11. The system of claim 8 wherein the ON command causes the lighting module to restore the light to a percentage of illumination capability that is stored in memory.

12. The system of claim 8 wherein the sensor module is further configured to receive a message over the home-control network comprising the threshold, wherein the threshold is user settable.

13. The system of claim 8 wherein the sensor module is further configured to determine whether the light is OFF by receiving and decoding a message transmitted over the home-control network, the message being transmitted in response to the manual input by the user and comprising the state of the light.

14. The system of claim 8 wherein the sensor module is further configured to determine whether the light is OFF by detecting the ambient light and comparing the detected ambient light to the threshold.

15. A sensor module to control a light on a home-control network, the sensor module comprising:
 a light detector configured to detect ambient light in an area proximate to a light;
 a motion detector configured to detect motion in the area proximate to the light;
 a transmitter configured to transmit through a home-control network a lighting control command to control a state of the light, the home-control network configured to propagate the lighting control command, the lighting control command being one of an ON command and an OFF command;
 a receiver configured to receive and decode messages from the home-control network; and
 computer hardware configured to start a timer having a timer count and send the ON command to the transmitter for transmission over the home-control network to turn the light ON in response to detected motion when the ambient light is less than a threshold, the computer hardware further configured to determine whether the light is OFF, the light being controlled independently of the sensor module by a switch configured to send the lighting control commands over the home-control network in response to a physical input by a user, the computer hardware further configured to set the timer count to an end count when the light is OFF in response to the physical input by the user.

16. The sensor module of claim 15 wherein the computer hardware is further configured to determine whether the light is OFF by receiving and decoding a message over the home-control network comprising the state of the light, the message being transmitted in response to the physical input by the user.

17. The sensor module of claim 15 wherein the computer hardware is further configured to determine whether the light is OFF by detecting the ambient light and comparing the detected ambient light to the threshold.

18. The sensor module of claim 15 wherein the computer hardware is further configured to set the timer count to a start count when the light is ON and motion is detected.

19. The sensor module of claim 15 wherein the computer hardware is further configured to transmit the OFF command through the home-control network when the light is ON, the timer times out, and no motion is detected.

20. The sensor module of claim 15 wherein the receipt of the ON command causes the light to illuminate to a percentage of illumination capability that is stored in memory.

\* \* \* \* \*